United States Patent
Liu et al.

(10) Patent No.: US 12,113,162 B2
(45) Date of Patent: Oct. 8, 2024

(54) BATTERY COMPRISING FIRST-TYPE BATTERY CELL GROUP AND SECOND-TYPE BATTERY CELL GROUP WHICH ARE CONNECTED IN SERIES, APPARATUS, AND METHOD AND DEVICE FOR MANUFACTURING BATTERY

(71) Applicant: Contemporary Amperex Technology Co., Limited, Ningde (CN)

(72) Inventors: Qian Liu, Ningde (CN); Yonghuang Ye, Ningde (CN); Chengdu Liang, Ningde (CN); Haizu Jin, Ningde (CN); Quanguo Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 120 days.

(21) Appl. No.: 17/556,991

(22) Filed: Dec. 20, 2021

(65) Prior Publication Data

US 2022/0115686 A1    Apr. 14, 2022

Related U.S. Application Data

(63) Continuation of application No. PCT/CN2021/089319, filed on Apr. 23, 2021.

(30) Foreign Application Priority Data

Apr. 30, 2020  (CN) .......................... 202010367231.1
Aug. 7, 2020   (CN) .......................... 202010786523.9

(51) Int. Cl.
*H01M 10/04*     (2006.01)
*H01M 10/0525*   (2010.01)
(Continued)

(52) U.S. Cl.
CPC ....... *H01M 10/04* (2013.01); *H01M 10/0525* (2013.01); *H01M 10/42* (2013.01);
(Continued)

(58) Field of Classification Search
CPC .. H01M 10/04; H01M 10/0525; H01M 10/42; H01M 10/625; H01M 50/258;
(Continued)

(56) References Cited

U.S. PATENT DOCUMENTS 8,993,140 B2   3/2015   Schiemann et al.
9,799,873 B2   10/2017  Kohlberger
(Continued)

FOREIGN PATENT DOCUMENTS

CN    101262049 A    9/2008
CN    101409369 A    4/2009
(Continued)

OTHER PUBLICATIONS

The International search report for PCT Application No. PCT/CN2021/089665, dated Jul. 30, 2021, 17 pages.
(Continued)

*Primary Examiner* — Maria Laios
(74) *Attorney, Agent, or Firm* — East IP P.C.

(57) ABSTRACT

The present application provides a battery and an apparatus. The battery includes: a first-type battery cell group and a second-type battery cell group which are connected in series, wherein the first-type battery cell group is composed of multiple first-type batteries connected in parallel, and the second type battery cell group is composed of at least one second type battery cell connected in parallel; the first-type battery cell and the second-type battery cell are battery cells of different chemical systems, and the volume energy density of the first-type battery cell is less than that of the second-type battery cell; and the capacity Cap1 of the
(Continued)

first-type battery cell group is greater than the capacity Cap2 of the second-type battery cell group, in which Cap1 is the sum of the capacities of the corresponding first-type battery cells, and Cap2 is the sum of the capacities of the corresponding second-type battery cells.

12 Claims, 5 Drawing Sheets

(51) Int. Cl.
*H01M 10/42* (2006.01)
*H01M 10/625* (2014.01)
*H01M 50/258* (2021.01)
*H01M 50/509* (2021.01)

(52) U.S. Cl.
CPC ....... *H01M 10/625* (2015.04); *H01M 50/258* (2021.01); *H01M 50/509* (2021.01); *H01M 2220/20* (2013.01)

(58) Field of Classification Search
CPC ........... H01M 50/509; H01M 2220/20; H01M 4/5825; H01M 50/204; H01M 50/249; H01M 50/267; H01M 16/00; H01M 10/4207; H01M 10/0404; H01M 2220/10; Y02E 60/10; Y02P 70/50
USPC .......................................................... 429/9
See application file for complete search history.

(56) References Cited

U.S. PATENT DOCUMENTS

| | | |
|---|---|---|
| 10,128,528 B2 | 11/2018 | Zhang et al. |
| 10,587,001 B2 | 3/2020 | Park |
| 2006/0197496 A1 | 9/2006 | Iijima et al. |
| 2007/0072059 A1 | 3/2007 | Kitao et al. |
| 2008/0241666 A1 | 10/2008 | Baba et al. |
| 2009/0162751 A1 | 6/2009 | Honbo et al. |
| 2010/0136391 A1 | 6/2010 | Prilutsky et al. |
| 2011/0086248 A1 | 4/2011 | Nakura |
| 2012/0126753 A1 | 5/2012 | Carkner |
| 2012/0164490 A1 | 6/2012 | Itoi et al. |
| 2012/0189885 A1 | 7/2012 | Kishii et al. |
| 2013/0337310 A1 | 12/2013 | Omura et al. |
| 2014/0020235 A1 | 1/2014 | Aramaki et al. |
| 2014/0087227 A1 | 3/2014 | Shih et al. |
| 2014/0181551 A1 | 6/2014 | Rahal-Arabi et al. |
| 2014/0186659 A1 | 7/2014 | Dhar et al. |
| 2014/0220391 A1 | 8/2014 | Fujii et al. |
| 2014/0342216 A1 | 11/2014 | Kohlberger |
| 2015/0132625 A1 | 5/2015 | Miyata et al. |
| 2015/0188188 A1 | 7/2015 | Zhang et al. |
| 2015/0188207 A1 | 7/2015 | Son et al. |
| 2015/0280276 A1 | 10/2015 | Lemke et al. |
| 2015/0357687 A1 | 12/2015 | Heeg et al. |
| 2015/0357688 A1 | 12/2015 | Heeg et al. |
| 2016/0099451 A1 | 4/2016 | Murai et al. |
| 2016/0126546 A1 | 5/2016 | Takami et al. |
| 2016/0200214 A1 | 7/2016 | Ishibashi et al. |
| 2016/0301045 A1 | 10/2016 | Tyler et al. |
| 2016/0380315 A1* | 12/2016 | Weicker ................ H02J 7/1423 320/136 |
| 2017/0365886 A1 | 12/2017 | Hoshina et al. |
| 2018/0034023 A1 | 2/2018 | Newman et al. |
| 2018/0138478 A1 | 5/2018 | Chan |
| 2018/0145383 A1 | 5/2018 | Krishnan et al. |
| 2018/0159101 A1 | 6/2018 | Tsang et al. |
| 2018/0351219 A1 | 12/2018 | Smith et al. |
| 2019/0067658 A1 | 2/2019 | Fujiwara et al. |
| 2019/0103625 A1 | 4/2019 | Haraguchi et al. |
| 2019/0157636 A1 | 5/2019 | Miler et al. |
| 2019/0225093 A1 | 7/2019 | Li et al. |
| 2019/0226859 A1 | 7/2019 | Li et al. |
| 2019/0267686 A1 | 8/2019 | Shimizu et al. |
| 2019/0334143 A1 | 10/2019 | Sugeno |
| 2020/0014000 A1 | 1/2020 | Roddy et al. |
| 2020/0058968 A1 | 2/2020 | Thompson et al. |
| 2020/0106126 A1 | 4/2020 | Yokoshima et al. |
| 2020/0130511 A1 | 4/2020 | Botts et al. |
| 2020/0313255 A1 | 10/2020 | Wu et al. |
| 2021/0050635 A1 | 2/2021 | Lee et al. |
| 2021/0074979 A1 | 3/2021 | Kwak et al. |
| 2021/0091428 A1 | 3/2021 | Naito et al. |
| 2021/0296721 A1 | 9/2021 | Omura et al. |
| 2021/0328281 A1 | 10/2021 | Chu et al. |
| 2021/0391628 A1 | 12/2021 | Hattendorff et al. |
| 2022/0123427 A1 | 4/2022 | Ren et al. |

FOREIGN PATENT DOCUMENTS

| | | |
|---|---|---|
| CN | 101504977 A | 8/2009 |
| CN | 101635372 A | 1/2010 |
| CN | 101675555 A | 3/2010 |
| CN | 201749897 U | 2/2011 |
| CN | 102027617 A | 4/2011 |
| CN | 102447301 A | 5/2012 |
| CN | 202308227 U | 7/2012 |
| CN | 101242011 B | 9/2012 |
| CN | 103311562 A | 9/2013 |
| CN | 104126238 A | 10/2014 |
| CN | 104979503 A | 10/2015 |
| CN | 105006586 A | 10/2015 |
| CN | 105186066 A | 12/2015 |
| CN | 105849968 A | 8/2016 |
| CN | 105914804 A | 8/2016 |
| CN | 106207016 A | 12/2016 |
| CN | 206225503 U | 6/2017 |
| CN | 107004920 A | 8/2017 |
| CN | 107112603 A | 8/2017 |
| CN | 107256971 A | 10/2017 |
| CN | 206567773 U | 10/2017 |
| CN | 108598598 A | 9/2018 |
| CN | 208507849 U | 2/2019 |
| CN | 109428114 A | 3/2019 |
| CN | 208674305 U | 3/2019 |
| CN | 109659465 A | 4/2019 |
| CN | 110048151 A | 7/2019 |
| CN | 110065414 A | 7/2019 |
| CN | 110071236 A | 7/2019 |
| CN | 209071461 U | 7/2019 |
| CN | 209183604 U | 7/2019 |
| CN | 110265591 A | 9/2019 |
| CN | 110265627 A | 9/2019 |
| CN | 110380144 A | 10/2019 |
| CN | 110444835 A | 11/2019 |
| CN | 110456275 A | 11/2019 |
| CN | 110678393 A | 1/2020 |
| CN | 110739424 A | 1/2020 |
| CN | 210040332 U | 2/2020 |
| CN | 210403875 U | 4/2020 |
| CN | 111106277 A | 5/2020 |
| CN | 111106278 A | 5/2020 |
| CN | 111446488 A | 7/2020 |
| CN | 111584792 A | 8/2020 |
| CN | 211295236 U | 8/2020 |
| CN | 111668408 A | 9/2020 |
| CN | 111668409 A | 9/2020 |
| CN | 211629259 U | 10/2020 |
| CN | 111900294 A | 11/2020 |
| CN | 213584016 U | 6/2021 |
| DE | 102012215495 A1 | 3/2014 |
| DE | 202017104111 U1 | 11/2018 |
| DE | 102017212223 A1 | 1/2019 |
| EP | 1265302 A2 | 12/2002 |
| EP | 3193402 A1 | 7/2017 |
| EP | 3261161 A1 | 12/2017 |
| EP | 3316391 A1 | 5/2018 |
| EP | 3358706 A1 | 8/2018 |
| EP | 3675218 A1 | 7/2020 |
| EP | 3905377 A1 | 11/2021 |
| EP | 3926724 A2 | 12/2021 |
| JP | H07320775 A | 12/1995 |

(56) References Cited

FOREIGN PATENT DOCUMENTS

| | | | |
|---|---|---|---|
| JP | H11121041 A | 4/1999 |
| JP | 2003174734 A | 6/2003 |
| JP | 2004342580 A | 12/2004 |
| JP | 2005071917 A | 3/2005 |
| JP | 2006079987 A | 3/2006 |
| JP | 2007059145 A | 3/2007 |
| JP | 2008226518 A | 9/2008 |
| JP | 2009021223 A | 1/2009 |
| JP | 2010250984 A | 11/2010 |
| JP | 2011065906 A | 3/2011 |
| JP | 2012113899 A | 6/2012 |
| JP | 2012234696 A | 11/2012 |
| JP | 2013509688 A | 3/2013 |
| JP | 2014072025 A | 4/2014 |
| JP | 2014112463 A | 6/2014 |
| JP | 2015018706 A | 1/2015 |
| JP | 2015133169 A | 7/2015 |
| JP | 2015170591 A | 9/2015 |
| JP | 2015530858 A | 10/2015 |
| JP | 2015204247 A | 11/2015 |
| JP | 2015211025 A | 11/2015 |
| JP | 2016139510 A | 8/2016 |
| JP | 2017139844 A | 8/2017 |
| JP | 2019003881 A | 1/2019 |
| JP | 2019009042 A | 1/2019 |
| JP | 2019129149 A | 8/2019 |
| JP | 2019139879 A | 8/2019 |
| JP | 2020035692 A | 3/2020 |
| JP | 2020527848 A | 9/2020 |
| JP | 2023509197 A | 3/2023 |
| JP | 2023509198 A | 3/2023 |
| WO | 2004095611 A1 | 11/2004 |
| WO | 2009113281 A1 | 9/2009 |
| WO | 2011114349 A2 | 9/2011 |
| WO | 2012014418 A1 | 2/2012 |
| WO | 2012060031 A1 | 5/2012 |
| WO | 2013011915 A1 | 1/2013 |
| WO | 2013031613 A1 | 3/2013 |
| WO | 2013069308 A1 | 5/2013 |
| WO | 2013099293 A1 | 7/2013 |
| WO | 2014045569 A1 | 3/2014 |
| WO | 2017191679 A1 | 11/2017 |
| WO | 2019065110 A1 | 4/2019 |
| WO | 2019123903 A1 | 6/2019 |
| WO | 2019161751 A1 | 8/2019 |
| WO | 2019187313 A1 | 10/2019 |
| WO | 2020133659 A1 | 7/2020 |
| WO | 2020133660 A1 | 7/2020 |
| WO | 2020134054 A1 | 7/2020 |
| WO | 2020135152 A1 | 7/2020 |

OTHER PUBLICATIONS

The International search report for PCT Application No. PCT/CN2021/089319, dated Jul. 26, 2021, 14 pages.
The First Office Action for Chinese Application No. 202010786641.X, dated Oct. 26, 2022, 16 pages.
The First Office Action for Chinese Application No. 202010786523.9, dated Oct. 24, 2022, 17 pages.
The extended European search report for EP Application No. 21789597.8, dated Nov. 16, 2022, 11 pages.
The partial supplementary extended European search report for EP Application No. 21789597.8, dated Aug. 12, 2022, 13 pages.
The extended European search report for EP Application No. 21790065.3, dated Nov. 18, 2022, 11 pages.
The partial supplementary extended European search report for EP Application No. 21790065.3, dated Aug. 18, 2022, 13 pages.
The First Office Action for Indian Application No. 202217009095, dated Dec. 16, 2022, 6 pages.
The Second Office Action for Chinese Application No. 202010786523.9, dated Feb. 28, 2023, 10 pages.
The Second Office Action for Japanese Application No. 2022-542009, dated Feb. 5, 2024, 9 pages.
The extended European search report for EP Application No. 20955829.5, dated Mar. 25, 2024, 8 pages.
The Notice of Allowability for U.S. Appl. No. 17/985,813, dated Feb. 22, 2024, 12pages.
The Notice of Allowability for Japanese Application No. 2022-542013, dated Mar. 18, 2024, 6 pages.
The Non-final Office Action for U.S. Appl. No. 18/053,493, dated Jan. 29, 2024, 39 pages.
The Non-Final Office Action for U.S. Appl. No. 17/970,603, dated Apr. 18, 2024, 17 pages.
The Non-final Office Action for U.S. Appl. No. 17/970,603, dated Jul. 19, 2023, 19 pages.
The First Office Action for Chinese Application No. 202080054659.9, dated Jun. 24, 2023, 12 pages.
The Non-final Office Action for U.S. Appl. No. 17/892,621, dated Feb. 3, 2023, 6 pages.
The Search Report by Registered Search Organization for Japanese Application No. 2022-542009, dated Aug. 16, 2023, 37 pages.
The First Office Action for Japanese Application No. 2022-542009, dated Sep. 4, 2023, 6 pages.
The Requirement for Restriction/Election for U.S. Appl. No. 18/054,375, dated Jul. 7, 2023, 8 pages.
The Non-final Office Action for U.S. Appl. No. 18/054,375, dated Aug. 24, 2023, 12 pages.
The extended European search report for EP Application No. 20961838.8, dated Aug. 17, 2023, 10 pages.
The Non-final Office Action for U.S. Appl. No. 17/985,851, dated Mar. 22, 2023, 9 pages.
The First Office Action for Japanese Application No. 2022-539699, dated Jul. 31, 2023, 8 pages.
The Non-final Office Action for U.S. Appl. No. 17/985,813, dated Mar. 8, 2023, 17 pages.
The Non-final Office Action for U.S. Appl. No. 17/985,813, dated Jun. 14, 2023, 19 pages.
The Final Office Action for U.S. Appl. No. 17/985,813, dated Aug. 9, 2023, 24 pages.
The Notice of Allowability for U.S. Appl. No. 17/985,813, dated Dec. 12, 2023, 9 pages.
The extended European search report for EP Application No. 20955828.7, dated Sep. 27, 2023, 6 pages.
The Search Report by Registered Search Organization for Japanese Application No. 2022-542013, dated Aug. 14, 2023, 48 pages.
The First Office Action for Japanese Application No. 2022-542013, dated Oct. 2, 2023, 9 pages.
The Non-final Office Action for U.S. Appl. No. 18/053,493, dated Mar. 9, 2023, 28 pages.
The extended European search report for EP Application No. 21937198.6, dated Aug. 14, 2023, 6 pages.
The Non-final Office Action for U.S. Appl. No. 18/149,672, dated May 30, 2023, 7 pages.
The International search report for PCT Application No. PCT/CN2020/105474, dated Apr. 26, 2021, 15 pages.
General Rules For Analytical scanning electron microscopy. JYT 010-1996, 12 pages.
Particle Size Analysis-Laser Diffraction Methods. GBT 19077-2016, 47 pages.
The extended European search report for European Application No. 20947010.3, dated Jan. 25, 2023, 9 pages.
The First Office Action for Chinese Application No. 202080054687.0, dated Jul. 24, 2023, 8 pages.
The extended European search report for European Application No. 20947817.1, dated Nov. 30, 2022, 7 pages.
The International search report for PCT Application No. PCT/CN2020/139180, dated Sep. 29, 2021, 6 pages.
The extended European search report for European Application No. 20955830.3, dated Mar. 30, 2023, 8 pages.
The International search report for PCT Application No. PCT/CN2020/119738, dated Jun. 25, 2021, 8 pages.
The International search report for PCT Application No. PCT/CN2020/129475, dated Aug. 16, 2021, 6 pages.
The Search Report by Registered Search Organization for Japanese Application No. 2022-539699, dated Jul. 13, 2023, 25 pages.

(56) References Cited

OTHER PUBLICATIONS

The International search report for PCT Application No. PCT/CN2020/119737, dated Jul. 2, 2021, 5 pages.
The International search report for PCT Application No. PCT/CN2020/119736, dated Apr. 28, 2021, 8 pages.
The International search report for PCT Application No. PCT/CN2021/109686, dated Apr. 25, 2022, 6 pages.
The Notice of Allowance for KR Application No. 10-2022-7021878, dated May 10, 2024, 6 pages.
The First Office Action for CN Application No. 202080104131.8, dated Jun. 4, 2024, 12 pages.
The First Office Action for KR Application No. 10-2022-7021104, dated Jul. 31, 2024, 15 pages.
The First Office Action for CN Application No. 202080102030.7, dated Jun. 18, 2024, 11 pages.
The Notice of Allowance for JP Application No. 2022-542009, dated Aug. 5, 2024, 6 pages.

\* cited by examiner

BATTERY COMPRISING FIRST-TYPE BATTERY CELL GROUP AND SECOND-TYPE BATTERY CELL GROUP WHICH ARE CONNECTED IN SERIES, APPARATUS, AND METHOD AND DEVICE FOR MANUFACTURING BATTERY

CROSS-REFERENCE TO RELATED APPLICATION

This application is a continuation of International Application No. PCT/CN2021/089319, filed on Apr. 23, 2021, which claims priority to Chinese Patent Application No. 202010367231.1 entitled "Battery Module, Apparatus, Battery Pack, and Method and Device for Manufacturing Battery Module" and filed on Apr. 30, 2020, and Chinese Patent Application No. 202010786523.9 entitled "Battery, Apparatus, and Method and Device for Manufacturing Battery" and filed on Aug. 7, 2020, which are incorporated herein by reference in their entireties.

TECHNICAL FIELD

This application relates to the technical field of energy storage devices, in particular to a battery, an apparatus, and method and device for manufacturing the battery.

BACKGROUND

Secondary batteries are clean and renewable resources, which can be used as driving energy sources or storage units in vehicles, energy storage and other fields.

With the increasing requirements for environmental protection of energy sources, the application of the secondary batteries has become increasingly popular and widespread. In order to adapt to the needs of different environments and application scenarios, the industry puts forward new requirements for the performance of the secondary batteries. For example, the secondary batteries are used as the driving energy sources of new energy vehicles. In order to meet the increasing endurance requirements of vehicles, the requirements for secondary energy are continuously increased.

The secondary battery is often formed of a combination of multiple battery cells. The overall energy of the secondary battery is often enhanced by increasing the number of battery cells in the industry; or the energy of the secondary battery is enhanced by developing battery cells of a new chemical system, for example, battery cells of nickel cobalt manganese oxide (NCM) chemical system are developed. The battery cell of nickel cobalt manganese oxide chemical system uses a NCM ternary material as a positive electrode material of the battery cell, which has higher volume energy density than an LFP material adopted by the positive electrode of the commonly used battery cell of lithium iron phosphate (hereinafter referred to as LFP) chemical system, and thus can obtain higher energy under the same volume conditions.

However, the effect of improving the energy of the secondary battery can be achieved by adding the number of battery cells, but the weight and volume of the secondary battery will also increase correspondingly, such that the use of the secondary battery is limited; and for the battery cell of NCM chemical system, its NCM material has serious gas production and increased internal resistance in use, resulting in serious heating of the battery cells, high expansion rate and other undesirable phenomena, which seriously affects the life cycle and the safety performance of the battery.

CN208674305U provides a battery module, including at least two ternary battery cells connected in series and a safety battery cell connected in series with the ternary battery cells. The safety battery cell includes a lithium-manganate battery cell and/or a lithium-iron-phosphate battery cell; the heat diffusion of the safety battery cell is less than that of the ternary battery cell, so the safety battery cell can effectively block the overall heat runaway diffusion of the battery module or delay the time of heat diffusion, thereby improving the safety performance of the battery module. However, it is discovered in use that the energy of the ternary battery cell cannot fully release the energy during the charging and discharging cycle process, which affects the performance of the battery module.

For this reason, how to ensure the safety performance of the secondary battery while further improving the performance of the secondary battery is an urgent problem to be solved by those skilled in the art.

SUMMARY

In order to solve the above problems, the present application provides a battery, an apparatus, and method and device for manufacturing the battery, which can effectively improve the energy output of the battery while ensuring the safety performance of the battery.

In order to achieve the above objectives, a first aspect of the present application provides a battery, including: a first-type battery cell group and a second-type battery cell group which are connected in series, wherein the first-type battery cell group is composed of multiple first-type batteries connected in parallel, and the second type battery cell group is composed of at least one second type battery cell connected in parallel (i.e., the second type battery cell group may include only one second-type battery or can be composed of multiple second-type batteries in parallel); the first-type battery cell and the second-type battery cell are battery cells of different chemical systems, and the volume energy density of the first-type battery cell group is less than the volume energy density of the second-type battery cell group; and the capacity Cap1 of the first-type battery cell group is greater than the capacity Cap2 of the second-type battery cell group, in which the capacity Cap1 of the first-type battery cell group is the sum of the capacities of the corresponding first-type battery cells, and the capacity Cap2 of the second-type battery cell group is the sum of the capacities of the corresponding second-type battery cells.

In the present application, the "battery cell" refers to a battery unit that can be independently charged and discharged. The battery cell structure includes a positive electrode, a negative electrode, a membrane, an electrolyte and an outer package used for packaging the positive electrode, the negative electrode, the membrane and the electrolyte. The types and shapes of the battery cells are not particularly limited in the present application, so the battery cells can be soft package battery cells, cylindrical battery cells, or square battery cells and other types of battery cells.

"Battery" refers to a single physical module that includes one or more battery cells to provide higher voltage and capacity. The battery may include a battery module and a battery pack. The "battery module" is formed by electrically connecting a certain number of battery cells together and putting them into a frame to protect the battery cells from external impact, heat, vibration and the like. A "battery pack" is the final state of the battery system that is installed in electric devices such as electric vehicles. Most of the current battery packs are made by assembling various control and protection systems such as battery management systems and thermal management components on one or more battery modules. With the development of technology, the level of battery modules can be omitted, i.e., battery packs are directly formed by batteries. This improvement allows the weight energy density and volume energy density of the battery system to be increased while the number of parts is significantly reduced.

The "battery cells of a chemical system" are classified according to the types of positive electrode materials of the battery cells, and the doped or added accessories are not limited. For example, the battery cell with lithium iron phosphate (including element-doped) as the positive electrode material can be defined as a battery cell of lithium iron phosphate chemical system; the battery cell with lithium nickel cobalt manganate (generally referred to as NCM) as the positive electrode material can be defined as a NCM chemical-system battery cell; and the battery cell with lithium nickel cobalt aluminate (generally referred to as NCA) as the positive electrode material is a NCA chemical-system battery cell, and both the NCM chemical-system battery cell and the NCA chemical-system battery cell belong to battery cells of ternary material chemical system.

"Capacity" refers to the initial capacity of the battery cell, and the specific value thereof is: the capacity of the first-type battery cell and the second-type battery cell at room temperature (25° C.), measured within the specific charging and discharging cut-off voltages and with 0.33 C as the discharging rate, and the unit is Ampere hour (abbreviated as Ah).

The volume energy density of the second-type battery cell is greater than the volume energy density of the first-type battery cell, so that under the same volume conditions, the second-type battery cell has more energy than the first-type battery cell; in the same way, under the same volume conditions, the second-type of battery cell group has more energy than the first-type of battery cell group. The capacity Cap1 of the first-type battery cell group is greater than the capacity Cap2 of the second-type battery cell group, so that during the charging and discharging cycle process of the battery including the first-type battery cell group and the second-type battery cell group in series, the impact of the first-type battery cell group on the energy release of the second-type battery cell group is reduced, and the characteristic of large volume energy density of the second-type battery cell group is fully exerted, thereby ensuring the energy throughput and the service life of the battery.

In some possible embodiments, the first-type battery cell group is composed of a plurality of first-type battery cells in parallel, and the capacity Cap1 of the first-type battery cell group is sum of the capacities of the plurality of first-type battery cells contained in the first-type battery cell group. Therefore, while ensuring the capacity of a first-type battery cell group, the capacity of a first-type battery cell group is allocated to a plurality of first-type battery cells. Compared with the large-volume and large-capacity battery cell, the smaller-volume and large-capacity battery cell has a simpler and more relaxed manufacturing process and conditions, thereby reducing the difficulty of manufacturing the large-capacity first battery pack.

In some possible embodiments, the first-type battery cell group and the second-type battery cell group are arranged in at least one row, and at least part of the second-type battery cell is located between the two first-type battery cells.

Gas generation, swelling, heat generation and other phenomena may occur during the charging and discharging cycle process of the battery cell, which forms stress in the battery, and excessive stress will affect the performance and the service life of the battery. The first-type battery cells and the second-type battery cells belonging to different chemical systems have different swelling degree and heat conductivity. The arrangement structure of the second-type battery between the two first-type batteries makes the first-type battery and the second-type battery arranged alternately. This structure helps to alleviate the problem of local stress concentration caused by the concentrated arrangement of cells based on the same chemical system. The reasonable arrangement of the first-type and second-type battery cells can effectively release the internal stress of the battery and improve the safety performance of the battery.

In some possible embodiments, the capacity Cap1 of the first-type battery cell group and the capacity Cap2 of the second-type battery cell group satisfy: $0.01 \leq (Cap1/Cap2)-1 \leq 0.5$.

The capacity Cap1 of the first-type battery cell group is greater than the capacity Cap2 of the second-type battery cell group, which can efficiently exhibit the characteristics of the high volume energy density of the second-type battery cell. The larger the difference between Cap1 of the first-type battery cell group and Cap2 of the second-type battery cell group is, theoretically the smaller the limit on the energy release of the second-type battery cell group (Note: when the difference between Cap1 of the first-type battery cell group and Cap2 of the second-type battery cell group reaches an upper limit, the first-type battery cell group no longer affects the energy release of the second-type battery cell group), thereby improving the overall energy release performance of the battery (energy unit: Watt-hour, abbreviated as Wh). However, for the same capacity setting, the first-type battery cell requires a larger volume setting than the second-type battery cell. Therefore, if the difference between the capacity of the first-type battery cell group and the capacity of the second-type battery cell group is too large, under the same battery capacity, the larger the volume ratio of the first-type battery cell is, the lower the overall volume energy density of the battery is, that is to say, the lower the battery energy is under the same volume condition. For this reason, in the optional embodiment of the present application, by controlling the value of (Cap1/Cap2) within the range of $0.01 \leq (Cap1/Cap2)-1 \leq 0.5$, the overall energy density of the battery is ensured, and the high energy density characteristics of the second-type battery cells can be fully exhibited, thereby improving the overall performance of the battery. The specific settings need to be determined according to the selection of different chemical-system type batteries and the actual needs of the batteries. In some exemplary embodiments, $0.02 \leq (Cap1/Cap2)-1 \leq 0.25$, and in some other exemplary embodiments, $0.04 \leq (Cap1/Cap2)-1 \leq 0.15$.

In some possible embodiments, before the capacity retention rate of the first-type battery cell and the second-type battery cell decays to 80% of the capacity (initial capacity), the capacity decay rate of the second-type battery cell is less than the capacity decay rate of the first-type battery cell, i.e., when the capacity retention rate of the first-type battery cell and the second-type battery cell decays to 80% of the capacity (initial capacity), the number of cycles of the second-type battery cell is greater than the number of cycles of the first-type battery cell. In the vehicle application and other fields of the secondary battery, during the recycling process of the battery (referring to all battery cells or the entire battery pack on the vehicle), when the battery ages to a certain extent (for example, its capacity decays to be less than 80% of its initial capacity), the requirements of vehicle operation may not be satisfied. For this reason, in the present application, the capacity of the first-type battery cell under working conditions decays faster, and the capacity of the second-type battery cell decays more slowly. Through the capacity matching design of the two types of battery cells, the initial capacity of the battery cell with faster decay rate is improved to prolong the overall service life of the battery module, that is, increase the number of cycles of the battery before the overall decay rate of the battery module reaches 80%.

In some possible embodiments of the present application, a first-type battery cell group includes a first-type battery cells and a second-type battery cell group includes b second-type battery cells, wherein a and b are natural numbers, and a≥1, b≥1. 0.1≤a/b≤50. In some exemplary embodiments, 0.5≤a/b≤30, and in some other exemplary embodiments, 1≤a/b≤10.

In the present application, the first-type battery cell has high capacity, low energy density and high safety; the second-type battery cell has low capacity, high energy density and worse safety. The first-type battery cell group can improve the overall safety performance of the battery, but an excessive number of the first-type battery cell groups will affect the overall volume energy density of the battery. The numbers of the first-type battery cell groups and the second-type battery cell groups are controlled within the range of 0.1≤a/b≤50, which can ensure the overall safety performance of the battery while increasing the overall volumetric energy density of the battery, thereby improving the overall performance of the battery module.

In some possible embodiments, if a>1, the capacity Cap1 of all the first-type battery cell groups is the same; and/or, when b>1, the capacity Cap2 of all the second-type battery cell groups is the same. The uniformity of the battery cell capacity of the same type can effectively improve the performance stability of the battery.

The same capacity means that the capacities of multiple battery cell groups are basically the same, and an error of less than 0.5% is an acceptable range.

In some possible embodiments, the ratio of the capacity of the first-type battery cell to the capacity of the second-type battery cell is from 10% to 150%.

The volume energy density of the first-type battery cell is less than the volume energy density of the second-type battery cell. When the ratio of the capacity of the first-type battery cell to the capacity of the second-type battery cell is from 10% to 150%, it is conducive to the adjustment of the proportion of different types of battery cell structure, thereby improving the rationality of the overall design of the battery.

In some possible embodiments, the first-type battery cell and the second-type battery cell satisfy at least one of the following conditions:

Condition 1: the ratio of the specific heat capacity C1 of the first-type battery cell to the specific heat capacity C2 of the second-type battery cell is 0.9≤C1/C2≤10. In some exemplary embodiments, it may be 1≤C1/C2≤6, and in some other exemplary embodiments, it may be 1.5≤C1/C2≤3.

The specific heat capacity refers to the amount of heat absorbed (or released) when a certain material per unit mass rises (or declines) per unit temperature. The greater the specific heat capacity is, the stronger the heat absorption or heat dissipation capability of the substance is. When the battery cell per unit mass is heated with the same amount of heat, the greater the specific heat capacity is, the smaller the temperature rise of the battery cell is. On the contrary, when the battery cell per unit mass is heated with the same amount of heat, the smaller the specific heat capacity is, the greater the temperature rise of the battery cell is. In the present application, the two battery cells with different specific heat capacities are connected together, the battery cell with greater temperature rise can transfer heat to the battery cell with smaller temperature rise, which is beneficial to the overall heat management of the module and the battery pack. Specifically, the C1/C2 is controlled within the range of 0.9≤C1/C2≤10. By controlling the heat absorption capacity of the first-type battery cell and the second-type battery cell, and adjusting the overall heat distribution during the operation of the module, the operating performance of the module is optimized. For example, in the high-temperature operating environment, the battery cell with high specific heat capacity properly absorbs the heat emitted by the battery cell with low specific heat capacity; and in the low-temperature operating environment, the battery cell with low specific heat capacity transfers heat to the battery cell with high specific heat capacity, thereby optimizing the overall heat distribution of the battery module, which in return improves the operating state of the battery module.

Condition 2: the ratio of the heat conductivity coefficient λ1 of the first-type battery cell to the heat conductivity coefficient λ2 of the second-type battery cell is 0.5≤λ1/λ2≤3. In some exemplary embodiments, it may be 0.7≤λ1/λ2≤2, and in some other exemplary embodiments, it may be 0.9≤λ1/λ2≤1.5. In the present application, the heat conductivity coefficient of the battery cell refers to a heat conductivity coefficient value in a direction perpendicular to the large surface of an electrode plate. In the electrode plate of the battery cell, the direction perpendicular to the surface of the active material of the electrode plate is the direction of the heat conductivity coefficient.

The heat conductivity coefficient reflects the heat conduction capability of the material, and the higher the value is, the stronger the heat conduction capability is. In the present application, the speed and capability of heat transfer in the first-type battery cell and the second-type battery cell and between the two types of battery cells are controlled by controlling the ratio of the heat conductivity coefficients (λ1/λ2) of the first-type battery cell and the second-type battery cell. Specifically, the battery cell with a greater heat conductivity coefficient transfers heat faster, and the battery cell with a smaller heat conductivity coefficient transfers heat more slowly. The two types of battery cells with different heat conductivity coefficients are connected together, and therefore, on one hand, in the low-temperature operating environment, the battery cell with faster heat transfer can transfer heat to the adjacent battery cell with slower heat transfer; and on the other hand, in the high-temperature environment or environment where a great deal of heat is generated, the battery cell with faster heat transfer will not accumulate heat, thus ensuring better low-temperature performance and higher safety performance of the module and the battery pack. In the embodiment of the present application, the value of λ1/λ2 is controlled within the range of 0.5 λ1/λ2≤3. The overall heat transfer rate and the heat distribution of the module can be effectively adjusted to optimize the operating performance of the module. For example, in the high-temperature operating environment, the high-temperature battery cell transfers heat to the low-temperature battery cell in time to avoid the overall performance degradation of the battery module caused by uneven heat distribution; and in the low-temperature operating environment, the high-temperature battery cell transfers heat to the low-temperature battery cell in time to heat up the low-temperature battery cell in time, thereby optimizing the overall heat distribution of the battery module, which in return improves the operating state of the battery module.

Condition 3: the ratio of the density ρ1 of the first-type battery cell to the density ρ2 of the second-type battery cell is 0.6≤ρ1/ρ2≤3. In some exemplary embodiments, it may be 0.8≤ρ1/ρ2≤2, and in some other exemplary embodiments, it may be 0.9≤ρ1/ρ2≤1.5.

The density of the battery cell also affects the heat transfer capability. In the present application, by controlling the density ratio (ρ1/ρ2) of the first-type battery cell and the second-type battery cell, the speed and capability of heat transfer in the first-type battery cell and the second-type battery cell and between the two types of battery cells are controlled. The value of ρ1/ρ2 is controlled within the above range. The overall heat transfer rate and the heat distribution of the module can be effectively adjusted to optimize the operating performance of the module. For example, in the high-temperature operating environment, the high-temperature battery cell transfers heat to the low-temperature battery cell in time to avoid the overall performance degradation of the battery module caused by uneven heat distribution; and in the low-temperature operating environment, the high-temperature battery cell transfers heat to the low-temperature battery cell in time to heat up the low-temperature battery cell in time, thereby optimizing the overall heat distribution of the battery module, which in return improves the operating state of the battery module It is worth noting that the specific heat capacity ratio, the heat conductivity coefficient ratio and the density ratio of the first-type battery cell and the second-type battery cell are cooperated, coordinated and debugged based on the types of the battery cells, the structure of the battery module and the application environments to optimize the overall performance of the battery module.

In some possible embodiments, the first-type battery cell and the second-type battery cell include, but are not limited to, lithium/sodium/magnesium ion battery cells, lithium/sodium/magnesium metal battery cells, lithium/sodium/magnesium-all-solid-state/semi-solid-state/quasi-solid-state/polymer/gel electrolyte-battery cells, and other rechargeable secondary battery cells. The types of the battery cells are not specifically limited in the present application.

In some possible embodiments, in the present application, the plateau voltage V1 of the first-type battery cell is from 3.15 V±0.05 V to 4.75 V±0.05 V; and the plateau voltage V2 of the second-type battery cell is from 3.60 to 3.80 V±0.05 V.

In the present application, the "plateau voltage" refers to: for a battery cell whose positive electrode material of the battery cell is a two-phase phase change material (such as LFP), its phase change voltage is its plateau voltage; and for a battery cell whose positive electrode material of the battery cell is a solid solution material (such as LCO or a ternary material), the plateau voltage is a voltage when its discharging capacity reaches a half of its initial capacity. Examples of specific values are: the plateau voltage of the conventional lithium-cobaltate chemical-system battery cell is about 3.7 V, the plateau voltage of the lithium-manganate (referred to as LMO) chemical-system battery cell is about 3.8 V, the plateau voltage of the NCM ternary material chemical-system battery cell is from 3.5 V to 3.85 V, and the plateau voltage of the lithium-iron-phosphate chemical-system battery cell is about 3.22 V.

In the present application, it is specifically enumerated that the first-type battery cell may be an LFP chemical-system battery cell or an LMO chemical-system battery cell, and the like, and the second-type battery cell may be a ternary material chemical-system battery cell (such as a NCM chemical-system battery cell or a NCA chemical-system battery cell), and the like.

During the operation of the battery cell, the voltage and the capacity of the battery cell are key factors for the energy release of the battery cell, and a reasonable plateau voltage helps to improve the battery performance. The specific selection is determined according to the capacity of the battery cell and the actual needs of the battery.

In some possible embodiments, the first-type battery cell is a lithium-iron-phosphate chemical-system battery cell; and the second-type battery cell is a ternary material chemical-system battery cell.

The second aspect of the present application provides a battery pack, including the above-mentioned battery.

The third aspect of the present application provides an apparatus, including the above-mentioned battery and using the battery as a power source. The apparatus includes, but is not limited to: vehicles, ships, airplanes, and various energy storage devices. The type and scope of the apparatus are not limited in the present application.

The fourth aspect of the present application provides a method for manufacturing the battery, including:
  obtaining multiple first-type battery cells and at least one second-type battery cell, wherein the first-type battery cell and the second-type battery cell are battery cells of different chemical systems, and the volume energy density of the first-type battery cell is less than that of second-type battery cell;
  connecting the multiple first-type battery cells in parallel to form a first-type battery cell group, and connecting the at least one second-type battery cell in parallel to form a second-type battery cell group,
  wherein, the capacity Cap1 of the first-type battery cell group is greater than the capacity Cap2 of the second-type battery cell group, the capacity Cap1 of the first-type battery cell group is the sum of the capacities of the corresponding first-type battery cells, and the capacity Cap2 of the second-type battery cell group is the sum of the capacities of the corresponding second-type battery cells; and
  connecting the first-type battery cell group and the second-type battery cell group in series.

In some possible embodiments, in the foregoing manufacturing method, connecting a plurality of first-type battery cells in parallel to form a first-type battery cell group includes: connecting a plurality of first-type battery cells in parallel to form a first-type battery cell groups, a is a natural number, and a≥1;
  connecting at least one second-type battery cell in parallel to form a second-type battery cell group includes: connecting at least one second-type battery cell in parallel to form b second-type battery cell groups, b is a natural number, and b≥1, wherein, 0.1≤a/b≤3, and in some exemplary embodiments, 0.3≤a/b≤2.

In some possible embodiments, the method further includes: arranging the first-type battery cells and the second-type battery cells in at least one row, and locating at least a part of the second-type battery cells between the two first-type battery cells.

The specific structure and requirements of the first type of battery cell group and the second type of battery cell group are as described above in the specific description of the battery provided in the present application, and will not be repeated.

The fifth aspect of the present application provides a device for manufacturing a battery, including a processor for controlling a clamping arm to obtain a plurality of first-type battery cells and at least one second-type battery cell, wherein the first-type battery cell and the second-type battery cell are battery cells of different chemical systems and the volume energy density of the first-type battery cell is less than the volume energy density of the second-type battery cell; and further for controlling an assembly component to connect a plurality of the first-type battery cells in parallel to form a first-type battery cell group, and to connect at least one second-type battery cell in parallel to form a second-type battery cell, wherein the capacity Cap1 of the first-type battery cell group is greater than the capacity Cap2 of the second-type battery cell group, the capacity Cap1 of the first-type battery cell group is the sum of the capacities of the corresponding first-type battery cells, and the capacity Cap2 of the second-type battery cell group is the sum of the capacities of the corresponding second-type battery cells; and connecting the first-type battery cell group and the second-type battery cell group in series.

In the above-mentioned manufacturing device, the specific structures and requirements of the first-type battery cell group and the second-type battery cell group are the same as the specific description of the battery provided in the present application above, and will not be repeated.

In addition to the technical problems solved by the embodiments of the present application described above, the technical features constituting the technical solutions, and the beneficial effects brought by the technical features of these technical solutions, the other technical problems capable of being solved by the battery and the apparatus provided by the embodiments of the present application, other technical features contained in the technical solutions, and the beneficial effects brought by these technical features will be described in further detail in the specific description of the embodiments.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

As described in the background art, under some circumstances, the energy of the secondary battery is often increased by increasing the number of battery cells of the secondary battery or developing battery cells with high volume energy density such as the NCM chemical-system battery cell. However, the mass and volume of the secondary battery will be increased due to the increase of the battery cells, and the NCM chemical-system battery cell has worse safety performance. If the LFP chemical-system battery cell with a high safety factor is connected in series with the NCM chemical-system battery cell for use, the characteristic of high volume energy density of the NCM chemical-system battery cell cannot be exerted. How to improve the output energy of the secondary battery while considering the safety of the secondary battery is still a problem to be solved urgently in the industry.

The inventors carried out in-depth research on the above-mentioned problems, and the research results found that:

The inventors conducted research on the characteristics of different chemical-system battery cells. The energy value of the battery cell is: energy=capacity*plateau voltage. The capacity of the battery cell directly determines the energy output of the battery cell. The battery cells of different chemical-system types have different service life decay modes.

Figure 1:
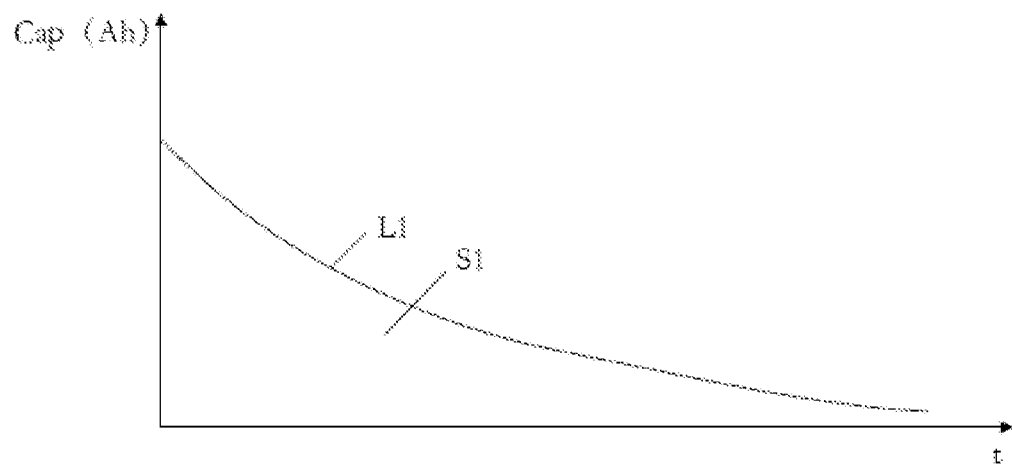
FIG. 1 is a schematic diagram showing the relationship between the capacity retention and the service life of a battery cell in an embodiment of a lithium-iron-phosphate chemical-system battery cell under some circumstances.

As shown in FIG. 1 that is a schematic diagram showing the relationship between the capacity retention and the service life of a battery cell in an embodiment of an LFP chemical-system battery cell, the X axis represents the working time of the battery cell, i.e., represents the service life of the battery cell, and the Y axis represents the capacity of the battery cell (in Ah). L1 represents a capacity decay curve of the LFP chemical-system battery cell, indicating that the service life of the LFP chemical-system battery cell decays faster in the early stage, then gradually slows down and approaches to a linear decay mode, and the flat linear slope changes from large to small in the later stage. The energy when the battery cell circulates to the $L^{th}$ circle is $E_L = V_L * Cap._L$, wherein $V_L$ represents the platform voltage of the LFP battery cell, and $Cap._L$ represents the capacity of the LFP chemical-system battery cell. In this way, the cumulative energy output during the theoretical life cycle of the LFP is $E_{Lt}$, $E_{Lt} = \Sigma_{L=0}^{x} E_L$, wherein x represents the total number of cycles; S1 represents the area from the lower side of L1 to the X axis region part, which indicates the total cumulative capacity of the LFP chemical-system battery cell throughout the life cycle, and S1 determines the total energy output of the LFP chemical-system battery cell throughout the life cycle.

Figure 2:
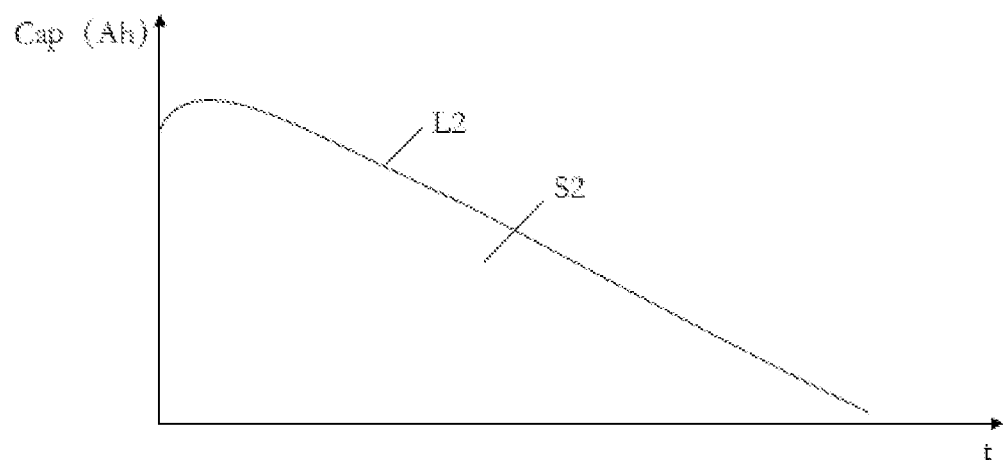
FIG. 2 is a schematic diagram showing the relationship between the capacity retention and the service life of a battery cell in an embodiment of a NCM chemical-system battery cell under some circumstances.

With reference to FIG. 2, FIG. 2 is a schematic diagram showing the relationship between the capacity retention and the service life of a battery cell in an embodiment of a NCM chemical-system battery cell. L2 represents the capacity decay curve of the NCM chemical-system battery cell, the NCM chemical-system battery cell decays slowly in the early stage, and decays faster and approaches to the linear decay mode in the later stage. The energy when the battery cell circulates to the nth circle is $E_N$, $E_N=V_N*Cap._N$, wherein $V_N$ represents the plateau voltage of the NCM chemical system battery cell, and $Cap._N$ represents the capacity of the NCM chemical system battery cell. The cumulative energy output during the theoretical life cycle is $E_{Nt}$, $E_{Nt}=\Sum_{n=0}^{y}E_n$, in which y represents the total number of cycles. S2 represents the area from the lower side of L2 to the X axis region part, which indicates the total cumulative capacity of the NCM chemical-system battery cell throughout the life cycle, and S2 determines the total energy output of the NCM chemical-system battery cell throughout the life cycle.

Theoretically, when a LFP chemical-system battery cells and b NCM chemical-system battery cells in the secondary battery cells are connected in series, the cumulative energy output within the theoretical life cycle is $E_T$, and $E_T=aE_{Lt}+bE_{Nt}$.

However, the inventor further found through research that, when the secondary battery is formed by connecting the battery cells of different chemical system types in series, the energy when the secondary battery circulates to the $k^{th}$ circle during actual use is $E_k$, $E_k=(a*V_L+b*V_N)*min.Cap.(L,N)$, the cumulative energy output within the actual life circle is $E_{Kt}$, $$E_{Kt}=\Sum_{k=0}^{z}E_k,$$

where z represents the total number of cycles, and min.Cap. (L,N) represents the capacity of the battery cell with the minimum capacity among the battery cells connected in series.

Figure 3:
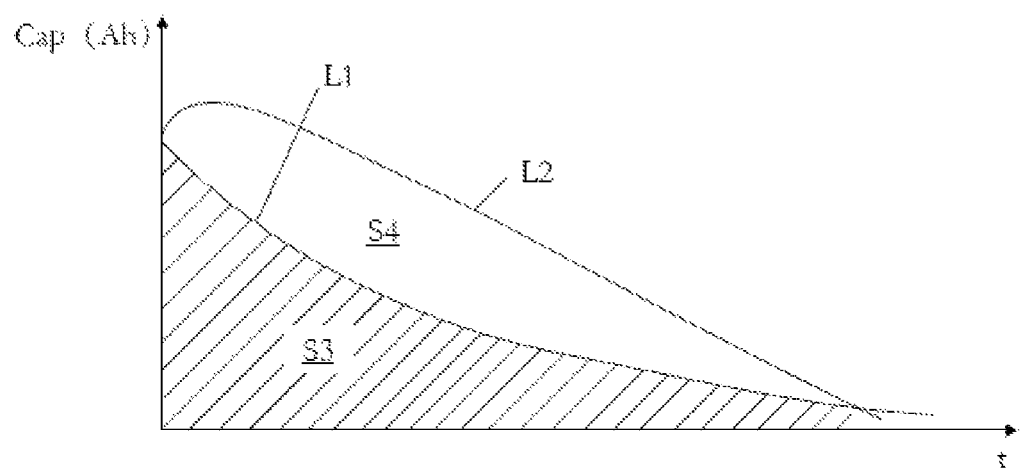
FIG. 3 is a schematic diagram showing the relationship between the capacity retention and the service life of a battery cell in a battery module in an embodiment in which a lithium-iron-phosphate chemical-system battery cell and a NCM chemical system battery cell are connected in series under some circumstances.

With reference to FIGS. 1-3, in the battery formed by connecting the LFP chemical-system battery cell in FIG. 1 and the NCM chemical-system battery cell in FIG. 2 in series (wherein the LFP chemical-system battery cell and the NCM chemical-system battery cell have the same capacity value), the output energy of the battery is the sum of the energy corresponding to the capacity of the overlapping part of S1 in FIG. 1 and S2 in FIG. 2, i.e., the energy corresponding to the capacity represented by the filling part S3 in FIG. 3, and the energy (it originally belongs to the energy contained in the NCM chemical-system battery cell) corresponding to the capacity represented by the filling part S4 does not exert the function, i.e., being wasted (wherein, when the battery is discharged, the LFP chemical-system battery cell and the NCM chemical-system battery cell use the respective common plateau voltages, for example, the plateau voltage of the LFP chemical-system battery cell is 3.22 v, and the plateau voltage of the NCM chemical-system battery cell is 3.68 v).

It can be seen that, during the actual operation of the secondary battery cell, each battery cell connected in series will affect the performance of the secondary battery, the theoretical cumulative energy output of the battery cannot be realized, and the total amount of energy released by the secondary battery depends on the battery cell with the minimum capacity. In FIG. 3, even though the NCM chemical-system battery cell has higher total capacity within the life cycle (i.e., it has greater theoretical output energy than the LFP chemical-system battery cell), the actual output is severely limited by the capacity decay trend of the LFP chemical-system battery cell within the life cycle, and high-efficiency energy output cannot be achieved, which affects the overall energy output efficiency of the secondary battery.

To this end, the present application provides a battery, comprising: a first-type battery cell group and a second-type battery cell group which are connected in series, wherein the battery comprises at least one first-type battery cell group and at least one second-type battery cell group, wherein the first-type battery cell group is composed of a plurality of first-type battery cells connected in parallel, and the second-type battery cell group is composed of at least one or a plurality of second-type battery cells connected in parallel. The first-type battery cells and the second-type battery cells are different chemical-system battery cells, and the volume energy density of the first-type battery cell is less than the volume energy density of the second-type battery cell; and wherein the capacity Cap1 of the first-type battery cell group is greater than the capacity Cap2 of the second-type battery cell group, and the capacity Cap1 of the first-type battery cell group is the sum of the capacities of the corresponding first-type battery cells (i.e., all the first-type battery cells in the first-type battery cell group), the capacity Cap2 of the second-type battery cell group is the sum of the corresponding second-type battery cells (i.e., all the second-type battery cells in the second-type battery cell group).

The volume energy density of the second-type battery cell is greater than that of the first-type battery cell, so that under the same volume condition, the second-type battery cell has more energy than the first-type battery cell. In the same way, under the same volume conditions, the second-type battery cell group has more energy than the first-type battery cell group. The capacity Cap1 of the first-type battery cell group is greater than the capacity of the capacity Cap2 of the second-type battery cell group, so that during the charging and discharging cycle of the battery formed by the first-type battery cell group and the second-type battery cell group in series, the limitation of the first-type battery cell group to the second-type battery cell group's power release is reduced, thereby efficiently exerting the characteristics of the high volume energy density of the second-type battery cell group and improving the overall energy throughput and service life of the battery.

EXEMPLARY EMBODIMENTS

Embodiment 1. A battery, comprising:
a first-type battery cell group and a second-type battery cell group which are connected in series,
wherein the first-type battery cell group is composed of multiple first-type batteries connected in parallel, and the second type battery cell group is composed of at least one second type battery cell connected in parallel; the first-type battery cell and the second-type battery cell are battery cells of different chemical systems, and the volume energy density of the first-type battery cell is less than the volume energy density of the second-type battery cell; and
the capacity Cap1 of the first-type battery cell group is greater than the capacity Cap2 of the second-type battery cell group, in which the capacity Cap1 of the first-type battery cell group is the sum of the capacities of the corresponding first-type battery cells, and the capacity Cap2 of the second-type battery cell group is the sum of the capacities of the corresponding second-type battery cells.

Embodiment 2. The battery according to embodiment 1, wherein the first-type battery cell group and the second-type battery core group are arranged in at least one row, and at least part of the second-type battery cell is located between the two first-type battery cells.

Embodiment 3. The battery according to embodiment 1 or 2, wherein the capacity Cap1 of the first-type battery cell group and the capacity Cap2 of the second-type battery cell group satisfy the following condition:

$$0.01 \leq (Cap1/Cap2)-1 \leq 0.5, \text{ optionally, } 0.02 \leq (Cap1/Cap2)-1 \leq 0.25, \text{ and further optionally, } 0.04 \leq (Cap1/Cap2)-1 \leq 0.15.$$

Embodiment 4. The battery according to embodiment 1 or 3, wherein the ratio of the capacity of the first-type battery cell to the capacity of the second-type battery cell is from 10% to 150%.

Embodiment 5. The battery according to any one of embodiment 1 to 4, wherein the first-type battery cell group comprises a first-type battery cells and the second-type battery cell group comprises b second-type battery cells; wherein a and b are natural numbers, and a≥1, b≥1. $0.1 \leq a/b \leq 50$, optionally, $0.5 \leq a/b \leq 30$, and further optionally, $1 \leq a/b \leq 10$.

Embodiment 6. The battery according to embodiment 5, wherein when a>1, the capacity Cap1 of all the first-type battery cell groups is the same; and/or, when b>1, the capacity Cap2 of all the second-type battery cell groups is the same.

Embodiment 7. The battery according to any one of embodiments 1 to 6, wherein the first-type battery cell and the second-type battery cell satisfy at least one of the following conditions:
the ratio of the specific heat capacity C1 of the first-type battery cell to the specific heat capacity C2 of the second-type battery cell is $0.9 \leq C1/C2 \leq 10$, optionally, $1 \leq C1/C2 \leq 6$, and further optionally, $1.5 \leq C1/C2 \leq 3$;
the ratio of the heat conductivity coefficient $\lambda 1$ of the first-type battery cell to the heat conductivity coefficient $\lambda 2$ of the second-type battery cell is $0.5 \leq \lambda 1/\lambda 2 \leq 3$, optionally, $0.7 \leq \lambda 1/\lambda 2 \leq 2$, and further optionally, $0.9 \leq \lambda 1/\lambda 2 \leq 1.5$;
the plateau voltage V1 of the first-type battery cell is from 3.15 V±0.05 V to 4.75 V±0.05 V; the plateau voltage V2 of the second-type battery cell is from 3.60 to 3.80 V±0.05 V; and
the ratio of the density $\rho 1$ of the first-type battery cell to the density $\rho 2$ of the second-type battery cell is $0.6 \leq \rho 1/\rho 2 \leq 3$, optionally, $0.8 \leq \rho 1/\rho 2 \leq 2$, and further optionally, $0.9 \leq \rho 1/\rho 2 \leq 1.5$.

Embodiment 8. The battery according to any one of embodiments 1 to 7, wherein the first-type battery cell is a lithium iron phosphate chemical-system battery cell.

Embodiment 9. The battery according to any one of embodiments 1 to 8, wherein the second-type battery cell is a ternary material chemical-system battery cell.

Embodiment 10. An apparatus, comprising the battery according to any one of embodiments 1 to 9, and using the battery as a power source.

Embodiment 11. A method for manufacturing a battery, comprising:
obtaining multiple first-type battery cells and at least one second-type battery cell, wherein the first-type battery cell and the second-type battery cell are battery cells of different chemical systems and the volume energy density of the first-type battery cell is less than the volume energy density of the second-type battery cell;
connecting the multiple first-type battery cells in parallel to form a first-type battery cell group, and connecting the at least one second-type battery cell in parallel to form a second-type battery cell group, wherein the capacity Cap1 of the first-type battery cell group is greater than the capacity Cap2 of the second-type battery cell group, the capacity Cap1 of the first-type battery cell group is the sum of the capacities of the corresponding first-type battery cells, and the capacity Cap2 of the second-type battery cell group is the sum of the capacities of the corresponding second-type battery cells; and
connecting the first-type battery cell group and the second-type battery cell group in series.

Embodiment 12. The method according to embodiment 11, wherein connecting the multiple first-type battery cells in parallel to form a first-type battery cell group includes: connecting a plurality of first-type battery cells in parallel to form a first-type battery cell groups, a is a natural number, and a≥1;
connecting the at least one second-type battery cell in parallel to form a second-type battery cell group includes: connecting at least one second-type battery cell in parallel to form b second-type battery cell groups, b is a natural number, and b≥1,
wherein $0.1 \leq a/b \leq 50$, optionally, $0.5 \leq a/b \leq 30$, and further optionally, $1 \leq a/b \leq 10$.

Embodiment 13. The method according to embodiment 11 or 12, further comprising:
arranging the multiple first-type battery cells and the at least one second-type battery cell in at least one row, and locating at least a part of the second-type battery cells between the two first-type battery cells.

Embodiment 14. A device for manufacturing a battery, comprising a processor for
controlling a clamping arm to obtain multiple first-type battery cells and at least one second-type battery cell, wherein the first-type battery cell and the second-type battery cell are battery cells of different chemical systems and the volume energy density of the first-type battery cell is less than the volume energy density of the second-type battery cell; and
further for controlling an assembly component to connect the multiple first-type battery cells in parallel to form a first-type battery cell group, and to connect the at least one second-type battery cell in parallel to form a second-type battery cell, wherein the capacity Cap1 of the first-type battery cell group is greater than the capacity Cap2 of the second-type battery cell group, the capacity Cap1 of the first-type battery cell group is the sum of the capacities of the corresponding first-type battery cells, and the capacity Cap2 of the second-type battery cell group is the sum of the capacities of the corresponding second-type battery cells; and
connecting the first-type battery cell group and the second-type battery cell group in series.

EXAMPLES

Figure 4:
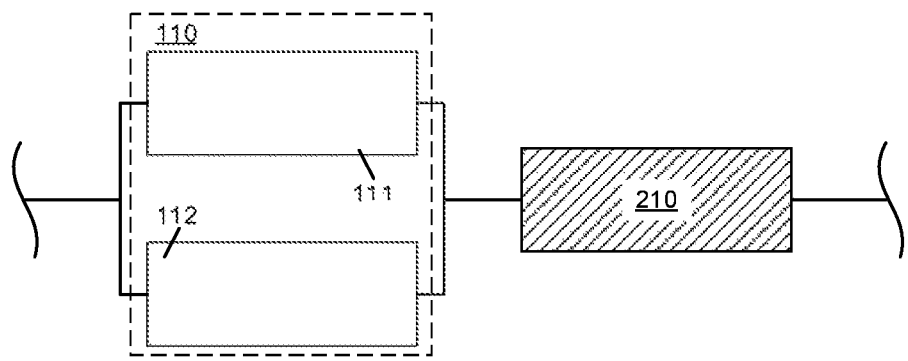
FIG. 4 is a schematic structural diagram of an embodiment of a battery of the present application.

Referring to FIG. 4, FIG. 4 is a schematic structural diagram of an embodiment of the present application.

The battery provided in this embodiment comprises one LFP chemical-system battery cell group 110 (as the first-type battery cell group), and one NCM chemical-system battery cell group 210 (as the second-type battery cell group). The LFP chemical-system battery cell group 110 and the NCM chemical-system battery cell group 210 are connected in series.

The LFP chemical-system battery cell group 110 is composed of the LFP chemical-system battery cell 111 and the LFP chemical-system battery cell 112 connected in parallel, and the capacity of the LFP chemical-system battery cell group 110 is the sum of the capacity of the LFP chemical-system battery cell 111 and the capacity of the LFP chemical-system battery cell.

The capacity of the LFP chemical-system battery cell group 110 is greater than the capacity of the NCM chemical-system battery cell group 210.

Continuing to refer to FIG. 4, the NCM chemical-system battery cell group 210 has only one NCM chemical-system battery cell. The volume energy density of the NCM chemical-system battery cell is greater than that of the LFP chemical-system battery cells 111 and 112.

In this embodiment, the LFP chemical-system battery cells 111 and 112 have the same structure, and have the same volume energy density and capacity. It is worth noting that in other embodiments, the battery cells 111 and 112 may have different capacities, which does not affect the realization of the objectives of the technical solution of the present application.

Figure 5:
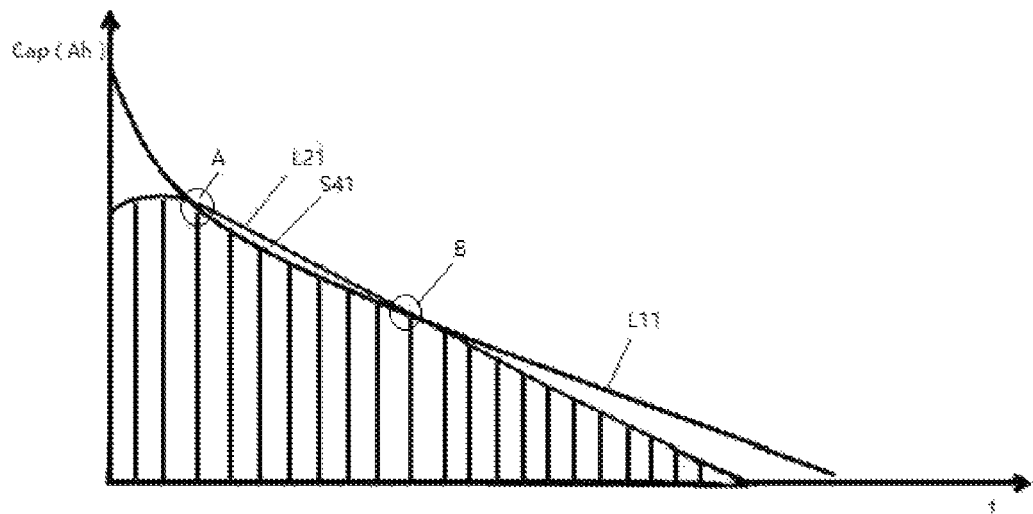
FIG. 5 is a schematic diagram showing the relationship between the capacity retention and the service life of a battery cell in a battery module in an embodiment of the battery module of the present application.

Referring to FIG. 5, FIG. 5 is a schematic diagram of accumulated energy output and life of the battery embodiment shown in FIG. 4 during operation.

In this embodiment, the plateau voltage of the LFP chemical-system battery cell group is about 3.22V, and the plateau voltage of the NCM chemical-system battery cell group is about 3.68V.

In FIG. 5, the line L11 is the capacity retention rate curve of the LFP system battery cell group 110, and the line L21 is the capacity retention rate curve of the NCM chemical-system battery cell group 210.

Referring to FIGS. 3 and 5, in this embodiment, the capacity (initial capacity) of the LFP chemical-system battery cell group 110 is greater than the capacity (initial capacity) of the NCM chemical-system battery cell group 210. In the first half of battery operation, the initial capacity of the LFP chemical-system battery cell group 110 decays faster, and the capacity of the NCM chemical-system battery cell group 210 decays more slowly in the early stage. The two types of chemical-system battery cell groups have the same capacity value for the first time at point A; during this period, the capacity of the LFP chemical-system battery cell group 110 is greater than that of the NCM chemical-system battery cell group 210, thus the total energy output of the LFP chemical-system batter cell group 110 and the NCM chemical-system battery cell group 210 depends on the capacity of the NCM chemical-system battery cell group 210.

After the A period, the capacity decay of the LFP chemical-system cell battery group 110 gradually slows down and approaches the linear decay mode, and the linear slope of the later flattening linearity changes from large to small, and the capacity of the NCM chemical-system battery cell group 210 decays faster in the later period, and approaches linear decay mode. During this period, the capacity values of the two types of battery cells appear to be the same at point B for the second time. Between the A period and the B period, the overall energy throughput of the battery depends on the capacity of the LFP chemical-system cell group 110, even if the total theoretical capacity of the NCM chemical-system battery cell group 210 is greater than the total theoretical capacity of the LFP chemical-system battery cell group 110.

After period B, the overall energy throughput of the battery depends on the capacity of the NCM chemical-system battery cell group 210, even if the total theoretical capacity of the LFP chemical-system battery cell group 110 is greater than the total theoretical capacity of the NCM chemical-system battery cell group 210.

The energy corresponding to the capacity represented by the area S41 formed between the two points A and B of the curves L11 and L21 is the unreleased energy of the NCM chemical-system battery cell group 210. However, comparing FIGS. 3 and 5, in this embodiment, by adjusting the capacity value of the LFP chemical-system battery cell group 110 to be greater than the capacity value of the NCM chemical-system cell group 210, the area of S41 in FIG. 5 is significantly smaller than that of S4 in FIG. 3, i.e. effectively reducing the energy waste of the NCM chemical-system battery cell group 210. The battery module provided in this embodiment more efficiently releases the energy of the NCM chemical-system battery cell group 210 with high energy density, and fully utilizes the volume energy density characteristics of the NCM chemical-system battery cell group 210 (i.e., high-density capacity battery cells).

In this embodiment, in order to more clearly illustrate the technical solution of the application and its beneficial effects, the capacity of the LFP chemical-system battery cell group 110 is adjusted so that the initial capacity of the LFP chemical-system battery cell group 110 is greater than that of the NCM chemical-system battery cell group 210.

However, it does not limit the protection scope of the technical solution of the present application. By adjusting the capacity of the first-type battery cell group with a lower volume energy density, it is greater than that of the second-type battery cell group with a higher volume energy density, i.e. improving the output energy efficiency of the second-type of battery cell, thereby improving the overall energy output efficiency of the battery provided in the present application.

However, as shown in FIG. 5, in the battery provided in this embodiment, there are also some LFP chemical-system battery cells (first-type battery cell) and NCM chemical system cells (second type cell) that cannot be fully released. If the difference between the capacity value of the first-type battery cell and the second-type battery cell is too large, it will cause waste. In some embodiments, the capacity Cap1 of the LFP chemical-system cell group and the capacity Cap1 of the NCM chemical-system cell group meet the following conditions: $0.01 \leq (Cap1/Cap2)-1 \leq 0.5$. In this way, the energy of the NCM chemical-system battery cell group can be effectively and fully released while reducing the energy waste of the LFP chemical-system battery cell group. In some embodiments, $0.02 \leq (Cap1/Cap2)-1 \leq 0.25$, in other embodiments, $0.04 \leq (Cap1/Cap2)-1 \leq 0.15$, and the specific value is determined according to actual needs.

In some embodiments of the present application, before the capacity retention rate of the first-type battery cell and the second-type battery cell decays to 80% of the capacity (initial capacity), the capacity decay rate of the second-type battery cell is less than the capacity decay rate of the first-type battery cell, i.e., when the capacity retention rate of the first-type battery cell and the second-type battery cell decays to 80% of the capacity (initial capacity), the number of cycles of the second-type battery cell is greater than the number of cycles of the first-type battery cell.

In the vehicle application and other fields of the secondary battery, during the recycling process of the battery (referring to all battery cells or the entire battery pack on the vehicle), when the battery ages to a certain extent (for example, its capacity decays to be less than 80% of its initial capacity), the requirements of vehicle operation may not be satisfied. For this reason, in the present application, the capacity of the first-type battery cell under working conditions decays faster, and the capacity of the second-type battery cell decays more slowly. Through the capacity matching design of the two types of battery cells, the initial capacity of the battery cell with faster decay rate is improved to prolong the overall service life of the battery module, i.e., increasing the number of cycles of the battery before the overall decay rate of the battery module reaches 80%.

In addition, the plateau voltage of the first-type battery cell and the second-type battery cell will also affect the overall energy release efficiency of the battery. In this embodiment:

the plateau voltage V1 of the first-type battery cell is 3.15V±0.05V~4.75V±0.05V; the plateau voltage V2 of the second-type battery cell is 3.60~3.80V±0.05V.

Continuing to refer to FIG. 4, the LFP chemical-system battery cell 111, the NCM chemical-system battery cell 210 (i.e., the NCM chemical-system battery cell group 210), the LFP chemical-system battery cell 112 are arranged in a row, and the NCM chemical-system battery cell 210 is located between the LFP chemical-system battery cell 111 and the LFP chemical-system battery cell 112, i.e. the LFP chemical-system battery cell and the NCM chemical-system battery cell are arranged alternately.

During the charging and discharging cycle of battery, each battery cell (including the LFP chemical-system battery cell 111, 112 and the NCM chemical-system battery cell 210, etc.) will produce gas, swell, and generate heat. The LFP chemical-system battery cell and the NCM chemical-system battery cell belonging to different chemical systems have different cell density, specific heat capacity, and thermal conductivity, so they will have different degrees of expansion and thermal diffusion, and form stress differences in different areas of the battery. If the stress difference is too large, the safety performance and electrical performance of the battery will be affected.

In this embodiment, the alternative arrangement structure of LFP chemical-system battery cells and NCM chemical-system battery cells helps to alleviate the problem of local stress concentration caused by the concentrated arrangement of battery cells based on the same chemical system, effectively releasing the internal stress of the battery, and promoting the balance of the stresses in different areas within the battery, thereby improving battery safety and electrical performance.

In some embodiments, the battery performance can be optimized by further setting the cell density, specific heat capacity, and thermal conductivity of the LFP chemical-system battery cell and the NCM chemical-system battery cell.

The ratio of the specific heat capacity C1 of the LFP chemical-system battery cell to the specific heat capacity C2 of the NCM chemical-system battery cell is $0.9 \leq C1/C2 \leq 10$, in some examples it can be $1 \leq C1/C2 \leq 6$, and in other examples it can be $1.5 \leq C1/C2 \leq 3$.

The ratio of the thermal conductivity $\lambda 1$ of the LFP chemical-system battery cell to the thermal conductivity $\lambda 2$ of the NCM chemical-system battery cell is $0.5 \leq \lambda 1/\lambda 2 \leq 3$, in some examples it can be $0.7 \leq \lambda 1/\lambda 2 \leq 2$, in other examples it can be $0.9 \leq \lambda 1/\lambda 2 \leq 1.5$.

The ratio of the cell density $\rho 1$ of the LFP chemical-system battery cell to the density $\rho 2$ of the NCM chemical-system battery cell is $0.6 \leq \rho 1/\rho 2 \leq 3$, in some examples it can be $0.8 \leq \rho 1/\rho 2 \leq 2$, and in other examples it can be $0.9 \leq \rho 1/\rho 2 \leq 1.5$.

Figure 6:
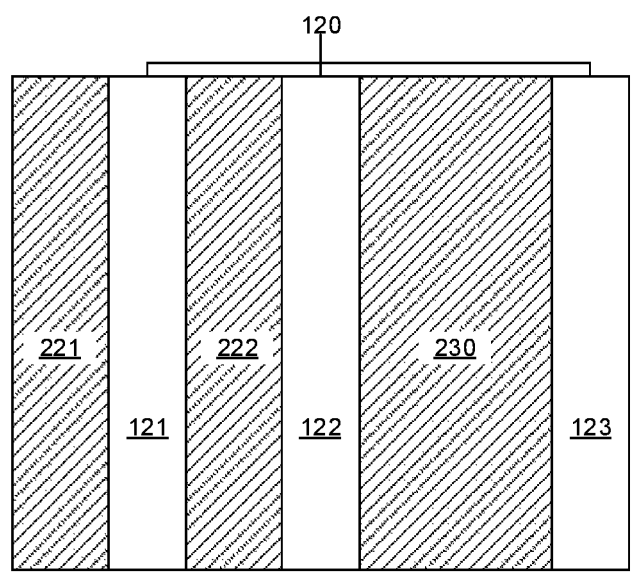
FIG. 6 is a schematic structural diagram of another embodiment of a battery of the present application.

Referring to FIG. 6, FIG. 6 is a schematic structural diagram of another embodiment of the battery provided by the present application.

The battery provided in this embodiment comprises one LFP chemical-system batter cell group 120 and two NCM chemical-system battery cell groups 220 and 230. The LFP chemical-system battery cell group 120 is connected in series with the NCM chemical-system battery cell groups 220 and 230. The capacity of the LFP chemical-system battery cell group 120 is greater than the capacities of the NCM chemical-system battery cell groups 220 and 230, respectively.

The LFP chemical-system battery cell group 110 is composed of the LFP chemical-system battery cell 121, the LFP chemical-system battery cell 122 and the LFP chemical-system battery cell 123 connected in parallel, and the capacity of the LFP chemical-system battery cell group 120 is the sum of the capacities of LFP chemical-system battery cells 121, 122 and 123.

In this embodiment, the capacities of the NCM chemical-system battery cell groups 220 and 230 are equal. The NCM chemical-system battery cell group 220 is composed of NCM chemical-system battery cells 221 and 222 connected in parallel, and the capacity of the NCM chemical-system cell battery group 220 is the sum of the capacities of the NCM chemical-system battery cells 221 and 222. The NCM chemical-system battery cell group 230 has a single battery cell structure.

The capacities of the NCM chemical-system battery cell groups 220 and 230 are equal, but compared to the single battery cell structure of the NCM chemical-system battery cell group 230, the NCM chemical-system battery cell group is composed of two NCM chemical-system battery cells 221 and 222. The volume of a single battery cell in the NCM chemical-system battery cell group 220 is smaller than that of the NCM chemical-system batter cell group 230. The small-volume battery cell has a more concise and relaxed manufacturing process and conditions, thereby reducing the reducing the difficulty of manufacturing the first battery pack with large capacity; in addition, compared with large-volume battery cells, small-volume battery cells can have a higher charge and discharge rate, and the flexibility of battery cell arrangement to improve the performance and design flexibility of the battery cell.

The NCM chemical-system battery cell 221, the LFP chemical-system battery cell 121, the NCM chemical-system battery cell 222, the LFP chemical-system battery cell 122, the NCM chemical-system battery cell 230, and the LFP chemical-system battery cell 123 are arranged in sequence.

It should be noted that in this embodiment, the capacities of the NCM chemical-system battery cell groups 220 and 230 are equal, but in other embodiments, if there are multiple NCM chemical-system battery cell groups, the capacity of each NCM chemical-system battery cell group can be all the same, part of the same, or all different, which is designed according to the overall needs of the battery and does not limit the protection scope of the present application.

Figure 7:
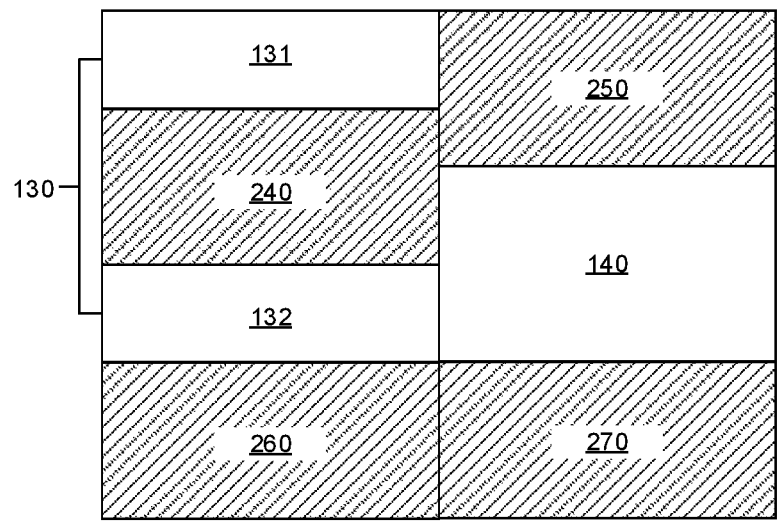
FIG. 7 is a schematic structural diagram of another embodiment of a battery of the present application.
Figure 8:
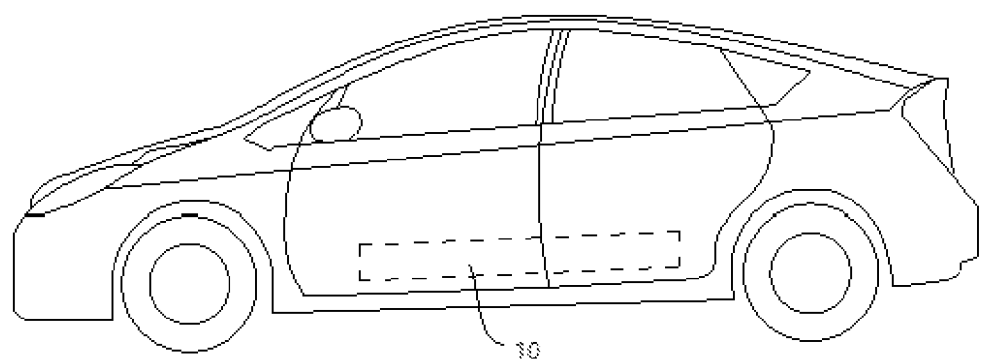
FIG. 8 is a schematic structural diagram of an embodiment of an apparatus of the present application.

Referring to FIG. 7, FIG. 7 is a schematic structural diagram of another embodiment of the battery provided by the present application.

The battery provided in this embodiment comprises two LFP chemical-system battery cell groups 130 and 140, and four NCM chemical-system battery cell groups 240, 250, 260, and 270. The above-mentioned multiple battery cell groups are connected in series.

The capacity of the two LFP chemical-system battery cell groups is greater than the capacity of the four NCM chemical-system battery cell groups. In this embodiment, the capacities of the two LFP chemical-system battery cell groups are the same or different, and the capacities of the four NCM chemical-system battery cell groups are the same or different, which does not limit the protection scope of the present application.

The LFP chemical-system battery cell group 130 is composed of LFP chemical-system battery cells 131 and LFP chemical-system battery cells 132 connected in parallel. The capacity of the LFP chemical-system battery cell group 130 is the sum of the capacities of the LFP chemical-system battery cells 131 and 132. The LFP chemical-system battery cell group 140 has a single battery cell structure.

In this embodiment, the four NCM chemical-system battery cell groups have the same capacity, and all have a single battery cell structure.

The LFP chemical-system battery cell 131, the NCM chemical-system battery cell 240 (i.e., the NCM chemical-system battery cell group 240), and the LFP chemical-system battery cell 132 are arranged in a row.

The NCM chemical-system battery cell 250 (i.e. NCM chemical-system battery cell group 250), LFP chemical-system battery cell 140, NCM chemical-system battery cell 260 (i.e. NCM chemical-system battery cell group 260), and NCM chemical-system battery cell 270 (i.e. NCM chemical-system battery cell group 270) are arranged in a row.

It is worth noting that the above-mentioned embodiment uses the LFP chemical-system battery cell as the first-type battery cell, and the NCM chemical-system battery cell as the second-type battery cell, but the choice of the first-type battery cell and the second-type battery cell in other embodiments of the present application is not limited.

For example, if the first-type battery cell is an LFP chemical-system battery cell, the second-type battery cell may be a NCM chemical-system battery cell, a NCA chemical-system battery cell, a lithium cobaltate chemical-system battery cell, or a lithium manganate chemical-system battery cell, and the like.

If the second-type battery cell is a ternary material chemical-system battery cell (such as NCA or NCM chemical-system battery cell), the first-type battery cell may be an LFP chemical-system battery cell, a lithium cobaltate chemical-system battery cell, or a lithium manganate chemical-system battery cell, etc.

In addition, the first-type battery cell and the second-type battery cell include, but are not limited to, lithium/sodium/magnesium ion battery cells, lithium/sodium/magnesium metal battery cells, lithium/sodium/magnesium-all-solid-state/semi-solid-state/quasi-solid-state/polymer/gel electrolyte-battery cells, and other rechargeable secondary battery cells.

The technical solutions of the present application and the advantages thereof are described in detail below through specific embodiments:

Battery preparation: the preparation methods of battery cells in various embodiments and comparative examples are as follows.

1. Preparation of Positive Electrode Slurry

A positive electrode material, conductive carbon Super P and a binder polyvinylidene fluoride (PVDF) were fully stirred and mixed in an appropriate amount of N-methylpyrrolidone (abbreviated as NMP) solvent at a weight ratio of 95:3:2 to form uniform and stable slurry with a viscosity of 3000 mPa·s to 20000 mPa·s, and the slurry generated no gelling, stratification or sedimentation and other phenomena within 24 to 48 hours.

2. Preparation of a Positive Electrode Plate

The positive electrode material slurry was uniformly coated on a positive electrode current collector Al foil, the electrode plate was cold pressed to a designed pressing pressure after drying, and the positive electrode plate was obtained by slitting the electrode plate for later use.

3. Preparation of Electrolyte

An equal volume of ethylene carbonate was dissolved in propylene carbonate, and then an appropriate amount of lithium hexafluorophosphate was uniformly dissolved in the mixed solvent for later use to obtain the electrolyte.

4. Preparation of a Negative Electrode Plate

A negative electrode active material such as graphite, conductive carbon, a binder polystyrene-butadiene copolymer (SBR), a thickener sodium carboxymethylcellulose (CMC) were fully stirred and mixed in an appropriate amount of water solvent at a weight ratio of 95:2:2:1 to form uniform and stable negative electrode slurry; and the slurry was evenly coated on a negative electrode current collector Cu foil, the electrode plate was cold pressed to the designed pressing pressure after drying, and was slit for later use.

5. Separator

PE or PP is selected as the separator.

6. Preparation of a Battery Cell

The positive electrode plate, the separator and the negative electrode plate were wound together by using the conventional battery cell manufacturing process to form a bare battery cell, then the bare battery cell was placed in a battery shell, the electrolyte was injected, then the procedures of forming and sealing were carried out, and a rechargeable power battery cell was obtained at last.

Test Method

1. The Test Method of the Capacity of the Battery Cell:

The battery cell to be tested was selected, and a battery cell charging and discharging machine and a high and low temperature box were used to test the full charging capacity and the discharging capacity of the battery cell at a standard rate at 25° C. The discharging capacity was the nominal capacity value of the battery cell, wherein the charging and discharging rate was 0.33 C (C represents the rated capacity of the battery cell. The charging/discharging current is the rate multiplied by the rated capacity of the battery cell, and the rated capacity is based on the battery cell capacity identified in the GBT certification document of the battery cell, or the battery module to which the battery cell belongs or the battery pack to which the battery cell belongs).

Specifically: the test procedures of the capacity of the battery cell were as follows: 1) standing for 30 minutes at 25° C.; 2) discharging at constant current of 0.33 C to a discharging cut-off voltage (for example, the NCM chemical-system battery cell was set to 2.8V, and the LFP chemical-system battery cell was set to 2.5V), and then standing for 30 minutes; 3) charging at constant current of 0.33 C to a charging cut-off voltage (for example, the NCM chemical-system battery cell was set to 4.35 V and the like according to the specific battery cell type, the LFP chemical-system battery cell was 3.65 V), charging at a constant voltage until the current is <0.05 C, and then standing for 5 minutes; and 4) discharging at constant current of 0.33 C to the discharging cut-off voltage. At this time, the measured discharging capacity was the nominal capacity value of the battery cell. Related terms and test methods refer to GB/T 19596, GB/T 31484-2015, GB/T 31485-2015, GB/T 31486-2015 and "Safety Requirements for Power Storage Batteries for Electric Vehicles".

2. The Test Method of the Capacity Retention Rate of the Battery Cell: Refer to GB/T 31484-2015 "Requirements and Test Methods for Cycle Life of Power Storage Batteries for Electric Vehicles".

The test method of the capacity retention rate of 1000 cycles (/25° C.):

The test steps of initial capacity (calculated as: Cap0) of battery cell included:

1) holding a newly delivered battery cell at 25° C. for 30 minutes; 2) discharging at constant current of 0.33 C to the discharging cut-off voltage (C represented the rated capacity of the battery cell. The charging/discharging current is the rate multiplied by the rated capacity of the battery cell, and the rated capacity is based on the battery cell capacity identified in the GBT certification document of the battery cell, or the battery module to which the battery cell belongs or the battery pack to which the battery cell belongs), and then standing for 30 minutes; 3) charging at constant current of 0.33 C to the charging cut-off voltage, charging at a constant voltage until the current is <0.05 C, and then standing for 5 minutes; and 4) discharging at constant current of 0.33 C to the discharging cut-off voltage, and then standing for 5 minutes. The discharging capacity measured from step 3) to step 4) was counted as Cap0.

Step 1) to step 4) was a charging and discharging cycle of the battery cell.

The above steps 1) to 4) were repeated for 1000 times, the discharging capacity measured at the 1000th time was counted as Capn, and the capacity retention rate at the 1000th time was: Capn/Cap0*100%.

3. Safety Performance Test

Test 1: the module was heated to triggers a heat runaway test, referring to the document of the Ministry of Industry and Information Technology [2016] No. 377 on Safety Technical Conditions for Electric Motor Coaches.

Whether a battery cell in the module will spread to the adjacent battery cell after heat runaway occurs due to heating is tested. For a test module composed of two or more battery cells to be tested, whether a heat insulation pad needs to be added between the battery cells and the thickness of the heat insulation pad are determined according to the specific scenario, and whether to turn on the water circulation is determined. A method for triggering heating heat runaway is selected, for example, a heating method of heating plate/heating sheet, the battery was fully charged, the simple module was fixed with a fixture, a heating sheet was placed close to the large surface of the first battery cell, and the simple module was fixed with two steel plate fixtures.

The heating sheet was connected to the power supply, the heating was started after a heating sheet power supply device was turned on, until the first battery cell generated heat runaway, the heating sheet was turned off, and the time when the second/Nth battery cell generated heat runaway was observed and recorded; and if the battery cell generating the heat runaway did not cause a fire or explosion to the adjacent battery cell, it was judged that heat spread barrier was realized, or otherwise, it was judged that the heat spread had occurred.

Test 2: the heat runaway test was triggered by module acupuncture, referring to GB/T 31485-2015. Specific test method was as follows:

whether a battery cell in the module will spread to the adjacent battery cell after heat runaway occurs due to acupuncture is tested. For the test module composed of battery cells to be tested, whether a heat insulation pad needs to be added between the battery cells and the thickness of the heat insulation pad are determined according to the specific scenario, and whether to turn on the water circulation is determined. The battery cell was fully charged, and the simple module was fixed with two steel plate fixtures with holes. A Φ3-Φ8 mm high temperature resistant stainless steel needle (the conical angle of the needle angle was 20° to 60°, and the surface of the needle was smooth and clean and free of rust, oxide layer and oil stains) penetrated to the first battery cell from a direction perpendicular to the battery cell at a speed of 0.1-40 mm/s to trigger the heat runaway, and the time when the second/$N^{th}$ battery cell generated the heat runaway was observed and recorded; and if the battery cell generating the heat runaway did not cause a fire or explosion to the adjacent battery cell, it was judged that the heat spread barrier was realized, or otherwise, it was judged that the heat spread had occurred.

4. Discharge Power Test Method

This application used the test current method. The test process reference was as follows:

(1) Test the maximum discharge current of the battery cell (using the test current method), the steps were as follows:

At room temperature, the discharge capacity Cap10 of the battery cell was tested; then, the battery cell was adjusted to the target state of charge (State of charge, SOC for short) (for example, 5% Cap10, 10% Cap10, 20% Cap10, 50% Cap10 or 90% Cap10, etc.), the temperature of the battery cell was adjusted to the target test temperature (for example, 25° C., 10° C., 0° C., −10° C., −20° C., and the test temperature accuracy was controlled at ±2° C.) and stood for 2 hours;

the discharge current I of battery cell was re-adjusted to achieve the purpose of discharging within a specific time (for example, 5 seconds, 10 seconds, 30 seconds, 180 seconds) to the lower cut-off voltage of the battery cell (the control accuracy of the discharge cut-off voltage needs to be within ±5 mV), the current I measured at this time was the maximum discharge current.

(2) Obtaining the maximum discharge power according to the formula P=I*Vend (Vend was the discharge cut-off voltage).

Related standards can refer to: GB/T 19596 Terminology of electric vehicle; GB/T 31486 Electrical performance requirements and test methods for power battery of electric vehicle.

Test Data

| | The first-type battery cell | The second-type battery cell | A first-type battery cell group | | A second-type battery cell group | | a/b | (Cap1/Cap2) −1 |
|---|---|---|---|---|---|---|---|---|
| | | | Capacity of a single battery cell [Ah] | Number (a) | Capacity of a single battery cell [Ah] | Number (b) | | |
| Example 1 | $LiFePO_4$ | NCM-811 | 50 | 2 | 99 | 1 | 2 | 1% |
| Example 2 | $LiFePO_4$ | NCM-721 | 40 | 3 | 118 | 1 | 3 | 2% |
| Example 3 | $LiFePO_4$ | NCM-712 | 30 | 5 | 144 | 1 | 5 | 4% |
| Example 4 | $LiFePO_4$ | NCM-622 | 15 | 10 | 130 | 1 | 10 | 15% |
| Example 5 | $LiFePO_4$ | NCM-523 | 45 | 2 | 72 | 1 | 2 | 25% |
| Example 6 | $LiMn_{0.7}Fe_{0.3}PO_4$ | NCM-514 | 70 | 3 | 140 | 1 | 3 | 50% |
| Example 7 | $LiMnPO_4$ | NCMA | 48 | 4 | 180 | 1 | 4 | 7% |
| Example 8 | $LiMnPO_4$ | NCMA | 48 | 4 | 90 | 2 | 2 | 7% |
| Example 9 | $LiFePO_4$ | NCM-811 | 40 & 60 | 2 | 94 | 1 | 2 | 6% |
| Example 10 | $Na_3V_2(PO_4)_2O_2F$ | $Na_{0.93}Cu_{0.22}Fe_{0.3}Mn_{0.48}O_2$ | 40 | 2 | 72 | 1 | 2 | 11% |
| Comparative Example 1 | $LiFePO_4$ single-type battery cell structure | / | 50 | 2 | / | / | / | / |
| Comparative Example 2 | / | NCM-721 single-type battery cell structure | / | / | 40 | 2 | / | / |
| Comparative Example 3 | $LiFePO_4$ | NCM-811 | 100 | 1 | 99 | 1 | 1 | / |
| Comparative Example 4 | $LiFePO_4$ | NCM-811 | 100 | 1 | 100 | 1 | 1 | / |

| | The ratio of the capacity of a first-type battery cell to that of a second-type battery cell | Average volume energy density of a single battery cell [Wh/L] | Average weight energy density of a single battery cell [Wh/kg] | Capacity retention rate after 1000 cycles | Safety test results | Discharge power of a single battery cell for 30 s @50% SOC, 25° C. [W] |
|---|---|---|---|---|---|---|
| Example 1 | 51% | 450 | 203 | 85% | Heat spread blocked | 1050 |
| Example 2 | 34% | 445 | 210 | 86% | Heat spread blocked | 1046 |
| Example 3 | 21% | 458 | 222 | 89% | Heat spread blocked | 1035 |
| Example 4 | 12% | 465 | 230 | 89% | Heat spread blocked | 1023 |
| Example 5 | 63% | 443 | 200 | 91% | Heat spread blocked | 980 |
| Example 6 | 50% | 447 | 205 | 90% | Heat spread blocked | 965 |
| Example 7 | 27% | 435 | 200 | 90% | Heat spread blocked | 1210 |
| Example 8 | 53% | 435 | 200 | 91% | Heat spread blocked | 1250 |
| Example 9 | | 448 | 201 | 88% | Heat spread blocked | 1030 |
| Example 10 | 56% | 152 | 90 | 89% | Heat spread blocked | 980 |
| Comparative Example 1 | / | 340 | 160 | 73% | Heat spread blocked | 800 |
| Comparative Example 2 | / | 470 | 238 | 88% | Heat spread | 1075 |
| Comparative Example 3 | / | 420 | 195 | 84% | Heat spread blocked | 995 |
| Comparative Example 4 | / | 420 | 195 | 71% | Heat spread blocked | 990 |

Note:
in Example 9, the $LiFePO_4$ group comprises two battery cells, and the capacities thereof are 40 and 60, respectively.

The present application further provides an apparatus, including the above-mentioned battery module, and using the battery module as a power source.

Figure 9:
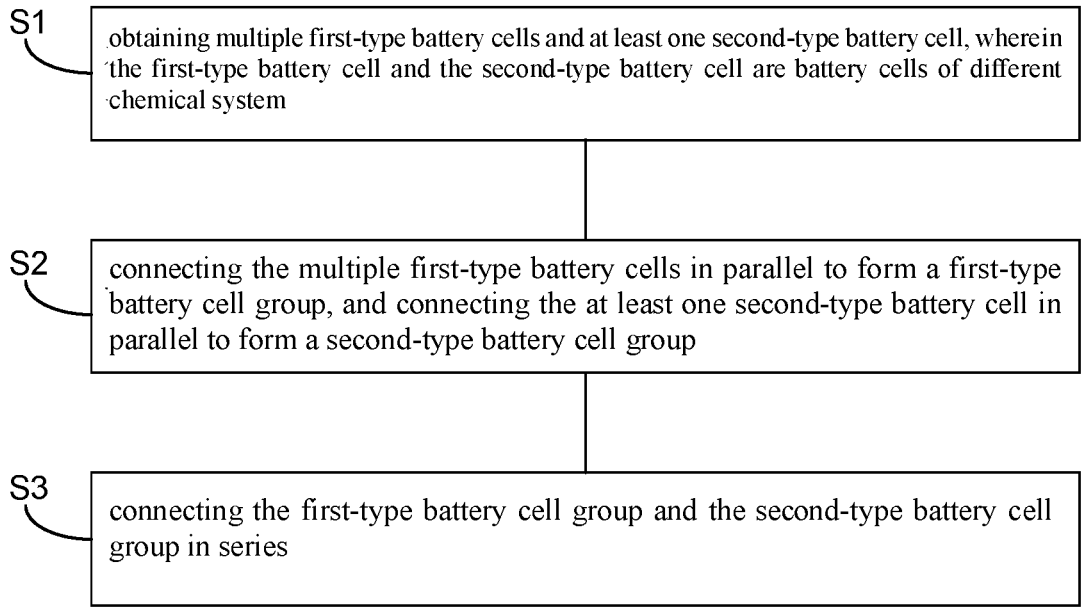
FIG. 9 is a schematic flow diagram of an embodiment of a method for manufacturing the battery of the present application.

Referring to FIG. 9, in this embodiment, the apparatus is a car, and a battery 10 provided by the present application is installed in the car to serve as its power source.

It is worth noting that, in other embodiments in this embodiment, the above-mentioned apparatus includes, but is not limited to: vehicles, ships, airplanes, and various energy storage devices. The type and scope of the apparatus are not limited in the present application.

Figure 10:
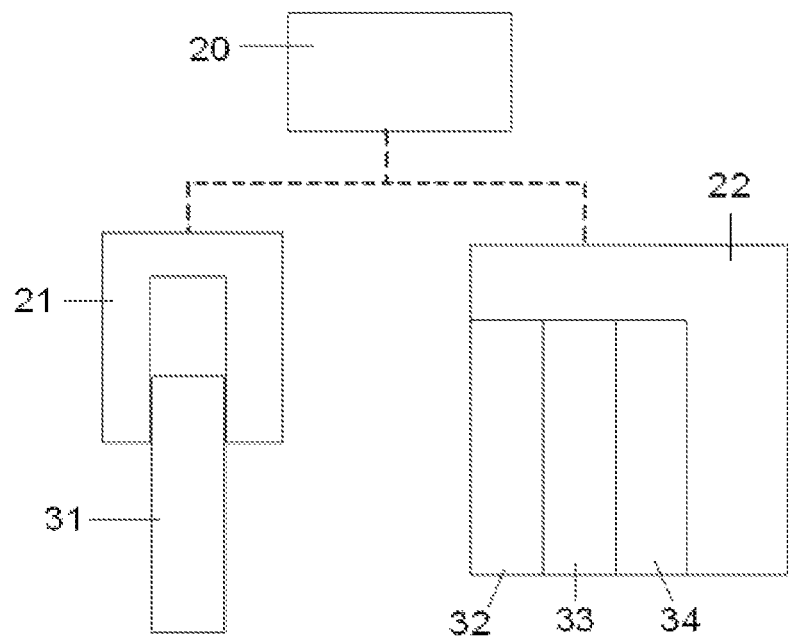
FIG. 10 is a schematic structural diagram of an embodiment of a device for manufacturing the battery of the present application.

Referring to FIG. 10, the present application further provides a method for manufacturing the battery module, including the following steps:

Step S1: obtaining a plurality of first-type battery cells and at least one second-type battery cell, wherein the first-type battery cells and the second-type battery cell are battery cells of different chemical systems, wherein the volume energy density of the first-type battery cell is less than the volume energy density of the second-type battery cell; and the capacity Cap1 of the first-type battery cell is greater than the capacity Cap2 of the second-type battery cell.

Step S2: connecting a plurality of first-type battery cells in parallel to form a first-type battery cell group, and connecting at least one second-type battery cell in parallel to form a second-type battery cell group;

wherein the capacity Cap1 of the first-type battery cell group is greater than the capacity Cap2 of the second-type battery cell group, the capacity Cap1 of the first-type battery cell group is the sum of the capacities of the corresponding first-type battery cells, and the capacity Cap2 of the second-type battery cell group is the sum of the capacities of the corresponding second-type battery cells;

Step S3: connecting the first-type battery cell group and the second-type battery cell group in series.

Connecting a plurality of first-type battery cells in parallel to form a first-type battery cell group includes: connecting a plurality of first-type battery cells in parallel to form a first-type battery cell group, a is a natural number, and a≥1;

connecting at least one second-type battery cell in parallel to form a second-type battery cell group includes: connecting at least one second-type battery cell in parallel to form b second-type battery cell groups, b is a natural number, and b≥1, wherein 0.1≤a/b≤3, in some examples, 0.3≤a/b≤2.

The number of a and b is not limited, for example, a is 1, 2, 3 . . . 10 . . . 100 . . . 1000 . . . 10000, b is 1, 2, 3 . . . 10 . . . 100 . . . 1000 . . . 10000, and the arrangement of the first-type battery cell and the second-type battery cell is not limited.

In some embodiments, a plurality of first-type battery cells and at least one second-type battery cell are arranged in at least one row, making at least a part of the second-type battery cells between the two first-type battery cells. The spaced arrangement of the first-type battery cells and the second-type battery cells can enhance the heat conduction between the first-type battery cells and the second-type battery cells, and reduce the stress generated based on expansion between the first-type battery cells and the second-type battery cells, thereby improving the overall performance of the battery cells.

This embodiment further provides a device for manufacturing the battery module. Referring to FIG. 10, the device for manufacturing the battery module includes a processor 20.

The processor 20 is adapted to controlling a clamping arm 21 to obtain a plurality of first-type battery cells 31, 32 and 34 and at least one second-type battery cell 33, wherein the first-type battery cells 31, 32 and 34 and the second-type battery cell 33 are battery cells of different chemical systems; moreover, the volume energy density of the first-type battery cells 31, 32, and 34 is smaller than the volume energy density of the second-type battery cell 33.

The processor 20 is also used to control the assembly component 22, and is used to connect the first-type battery cells 31, 32, 34 and the second-type battery core 33 in series to form a battery module.

If the battery includes a plurality of first-type battery cell groups and a plurality of second-type battery cell groups, and each first-type battery cell group includes a plurality of first-type battery cells, each second-type battery cell group includes a plurality of second-class battery cells. The processor connects the first-type battery cells that belong to the same first-type battery cell group in parallel, and connects the second-type battery cells that belong to the same second-type battery cell group in parallel; and connects a plurality of first-type battery cell groups and a plurality of second-type battery cell groups in series.

In some embodiments, the assembling component 22 arranges the plurality of first-type battery cells and at least one second-type battery cell in at least one row, and at least part of the second-type battery cells are located between the two first-type battery cells.

The capacity Cap1 of a first-type battery cell group is greater than the capacity Cap2 of a second-type battery cell group, and the capacity Cap1 of the first-type battery cell group is the sum of the capacities of the corresponding first-type battery cells. The capacity Cap2 of the second-type battery cell group is the sum of the capacities of the corresponding second-type battery cells.

The processor 20, the clamping arm 21 and the assembly component 22, and the method for the processor 20 to control the clamping arm 21 and the assembly component 22 are related arts in the field, which do not limit the protection scope of the present application, and thus will not be repeated herein.

The embodiments or examples in this specification are described in a progressive manner, and each embodiment focuses on the differences from other embodiments, and the same or similar parts between the various embodiments can be referred to each other.

In the description of this specification, the description with reference to the terms "one embodiment", "some embodiments", "exemplary embodiments", "examples", "specific examples", or "some examples" and the like means that the specific features, structures, materials, or characteristics described in combination with the embodiments or examples are included in at least one embodiment or example of the present application. In this specification, the schematic expression of the above-mentioned terms does not necessarily refer to the same embodiment or example. Moreover, the described specific features, structures, materials or characteristics can be combined in any one or more embodiments or examples in a suitable manner.

It should be noted that the above embodiments are only used to illustrate the technical solutions of the present application, rather than limiting the present application. Although the present application has been described in detail with reference to the foregoing embodiments, those of ordinary skill in the art should understood that: modifications can still be made to the technical solutions recorded in the foregoing embodiments, or equivalent replacements are made to some or all of the technical features; and these modifications or replacements do not make the essence of the corresponding technical solutions deviate from the scope of the technical solutions of the embodiments of the present application.

What is claimed is:

1. A battery, comprising:
   a first-type battery cell group and a second-type battery cell group which are connected in series,
   wherein the first-type battery cell group is composed of multiple first-type batteries connected in parallel, and the second type battery cell group is composed of at least one second type battery cell connected in parallel;
   the first-type battery cell and the second-type battery cell are battery cells of different chemical systems, and a volume energy density of the first-type battery cell is less than a volume energy density of the second-type battery cell;

a capacity Cap1 of the first-type battery cell group is greater than a capacity Cap2 of the second-type battery cell group, and wherein the capacity Cap1 of the first-type battery cell group and the capacity Cap2 of the second-type battery cell group satisfy the following condition: $0.01 \leq (Cap1/Cap2)-1 \leq 0.5$, in which the capacity Cap1 of the first-type battery cell group is the sum of the capacities of the corresponding first-type battery cells, and the capacity Cap2 of the second-type battery cell group is the sum of the capacities of the corresponding second-type battery cells;

wherein the first-type battery cell and the second-type battery cell satisfy at least one of the following conditions:

a ratio of a specific heat capacity C1 of the first-type battery cell to a specific heat capacity C2 of the second-type battery cell is $0.9 \leq C1/C2 \leq 10$, optionally, $1 \leq C1/C2 \leq 6$, and further optionally, $1.5 \leq C1/C2 \leq 3$;

a ratio of a heat conductivity coefficient $\lambda 1$ of the first-type battery cell to a heat conductivity coefficient $\lambda 2$ of the second-type battery cell is $0.5 \leq \lambda 1/\lambda 2 \leq 3$, optionally, $0.7 \leq \lambda 1/\lambda 2 \leq 2$, and further optionally, $0.9 \leq \lambda 1/\lambda 2 \leq 1.5$;

a plateau voltage V1 of the first-type battery cell is from $3.15 V \pm 0.05 V$ to $4.75 V \pm 0.05 V$; a plateau voltage V2 of the second-type battery cell is from 3.60 to 3.80 $V \pm 0.05 V$; or a ratio of a density $\rho 1$ of the first-type battery cell to a density $\rho 2$ of the second-type battery cell is $0.6 \leq \rho 1/\rho 2 \leq 3$, optionally, $0.8 \leq \rho 1/\rho 2 \leq 2$, and further optionally, $0.9 \leq \rho 1/\rho 2 \leq 1.5$.

2. The battery according to claim 1, wherein the first-type battery cell group and the second-type battery core group are arranged in at least one row, and at least part of the second-type battery cell is located between the two first-type battery cells.

3. The battery according to claim 1, wherein the capacity Cap1 of the first-type battery cell group and the capacity Cap2 of the second-type battery cell group satisfy the following condition:

$0.02 \leq (Cap1/Cap2)-1 \leq 0.25$, and optionally, $0.04 \leq (Cap1/Cap2)-1 \leq 0.15$.

4. The battery according to claim 1, wherein a ratio of a capacity of the first-type battery cell to a capacity of the second-type battery cell is from 10% to 150%.

5. The battery according to claim 1, wherein the first-type battery cell group comprises a first-type battery cells and the second-type battery cell group comprises b second-type battery cells; wherein a and b are natural numbers, and $a \geq 1$, $b \geq 1$, $0.1 \leq a/b \leq 50$, optionally, $0.5 \leq a/b \leq 30$, and further optionally, $1 \leq a/b \leq 10$.

6. The battery according to claim 5, wherein when $a>1$, the capacity Cap1 of all the first-type battery cell groups is the same; and/or, when $b>1$, the capacity Cap2 of all the second-type battery cell groups is the same.

7. The battery according to claim 1, wherein the first-type battery cell is a lithium iron phosphate chemical-system battery cell.

8. The battery according to claim 1, wherein the second-type battery cell is a ternary material chemical-system battery cell.

9. An apparatus, comprising the battery according to claim 1, and using the battery as a power source.

10. A method for manufacturing a battery, comprising:

obtaining multiple first-type battery cells and at least one second-type battery cell, wherein the first-type battery cell and the second-type battery cell are battery cells of different chemical systems and a volume energy density of the first-type battery cell is less than a volume energy density of the second-type battery cell;

connecting the multiple first-type battery cells in parallel to form a first-type battery cell group, and connecting the at least one second-type battery cell in parallel to form a second-type battery cell group, wherein a capacity Cap1 of the first-type battery cell group is greater than a capacity Cap2 of the second-type battery cell group, the capacity Cap1 of the first-type battery cell group is the sum of the capacities of the corresponding first-type battery cells, and the capacity Cap2 of the second-type battery cell group is the sum of the capacities of the corresponding second-type battery cells; and connecting the first-type battery cell group and the second-type battery cell group in series;

wherein the first-type battery cell and the second-type battery cell satisfy at least one of the following conditions:

a ratio of a specific heat capacity C1 of the first-type battery cell to a specific heat capacity C2 of the second-type battery cell is $0.9 \leq C1/C2 \leq 10$, optionally, $1 \leq C1/C2 \leq 6$, and further optionally, $1.5 \leq C1/C2 \leq 3$;

a ratio of a heat conductivity coefficient $\lambda 1$ of the first-type battery cell to a heat conductivity coefficient $\lambda 2$ of the second-type battery cell is $0.5 \leq \lambda 1/\lambda 2 \leq 3$, optionally, $0.7 \leq \lambda 1/\lambda 2 \leq 2$, and further optionally, $0.9 \leq \lambda 1/\lambda 2 \leq 1.5$;

a plateau voltage V1 of the first-type battery cell is from $3.15 V \pm 0.05 V$ to $4.75 V \pm 0.05 V$; a plateau voltage V2 of the second-type battery cell is from 3.60 to 3.80 $V \pm 0.05 V$; or a ratio of a density $\rho 1$ of the first-type battery cell to a density $\rho 2$ of the second-type battery cell is $0.6 \leq \rho 1/\rho 2 \leq 3$, optionally, $0.8 \leq \rho 1/\rho 2 \leq 2$, and further optionally, $0.9 \leq \rho 1/\rho 2 \leq 1.5$.

11. The method according to claim 10, wherein connecting the multiple first-type battery cells in parallel to form a first-type battery cell group includes: connecting a plurality of first-type battery cells in parallel to form a first-type battery cell groups, a is a natural number, and $a \geq 1$;

connecting the at least one second-type battery cell in parallel to form a second-type battery cell group includes: connecting at least one second-type battery cell in parallel to form b second-type battery cell groups, b is a natural number, and $b \geq 1$, wherein $0.1 \leq a/b \leq 50$, optionally, $0.5 \leq a/b \leq 30$, and further optionally, $1 \leq a/b \leq 10$.

12. The method according to claim 10, further comprising:

arranging the multiple first-type battery cells and the at least one second-type battery cell in at least one row, and locating at least a part of the second-type battery cells between the two first-type battery cells.

* * * * *